United States Patent
Kasprzak

(10) Patent No.: US 12,507,897 B2
(45) Date of Patent: Dec. 30, 2025

(54) SYSTEM OF OBTAINING THREE-DIMENSIONAL (3D) SCAN OF BODY PART FROM MULTIPLE VIEWING DIRECTIONS AND PRESENTING AUGMENTED IMAGES ON DISPLAY UNIT

(71) Applicant: TRICHOLAB SPÓŁKA Z OGRANICZONĄ ODPOWIEDZIALNOŚCIĄ, Warsaw (PL)

(72) Inventor: Michał Paweł Kasprzak, Falenty Duże (PL)

(73) Assignee: TRICHOLAB SPÓŁKA Z OGRANICZONĄ ODPOWIEDZIALNOŚCIĄ, Warsaw (PL)

( * ) Notice: Subject to any disclaimer, the term of this patent is extended or adjusted under 35 U.S.C. 154(b) by 355 days.

(21) Appl. No.: 18/113,918

(22) Filed: Feb. 24, 2023

(65) Prior Publication Data
US 2024/0016388 A1    Jan. 18, 2024

(30) Foreign Application Priority Data

Jul. 16, 2022    (PL) .......................................... 441749

(51) Int. Cl.
*A61B 5/00*    (2006.01)
*A61B 34/00*    (2016.01)
(Continued)

(52) U.S. Cl.
CPC ............ *A61B 5/0077* (2013.01); *A61B 34/10* (2016.02); *A61B 34/25* (2016.02);
(Continued)

(58) Field of Classification Search
None
See application file for complete search history.

(56) References Cited

U.S. PATENT DOCUMENTS 9,167,999 B2    10/2015    Zhang et al.
10,573,019 B1 *  2/2020    Anadure ............... G06F 16/532
(Continued)

OTHER PUBLICATIONS

European Application No. 23158183.6, Extended European Search Report, Jan. 29, 2024.
(Continued)

*Primary Examiner* — Haris Sabah
(74) *Attorney, Agent, or Firm* — NIXON & VANDERHYE P.C.

(57) ABSTRACT

A system (SYS) for obtaining a three-dimensional (3D) scan of a body part or a complete body to enable inspection of at least a part of the body part or the complete body is described. The system has an image acquisition system (IAQ) configured for obtaining a plurality of images (IMGS) from the body part or the complete body from a first plurality of first viewing directions and configured for obtaining a plurality of depth maps (DIMGS) from the body part or the complete body from a second plurality of second viewing directions. The system has an image processor (IPROC) configured for determining a three-dimensional model of the body part. The system has an augmenting unit (AUU) configured for using the three-dimensional model and augmented visual information to augment at least part of the plurality of images with the augmented visual information to obtain a plurality of augmented images, and configured for presenting a sequence of at least part of the plurality of augmented images on the display unit allowing to perceive a three-dimensional visualization of the body part or the complete body as augmented with the augmented visual information.

20 Claims, 11 Drawing Sheets

(51) Int. Cl.
  *A61B 34/10* (2016.01)
  *G06T 3/60* (2006.01)
  *G06V 10/24* (2022.01)

(52) U.S. Cl.
  CPC ........... *A61B 2034/105* (2016.02); *G06T 3/60* (2013.01); *G06V 10/24* (2022.01); *G06V 2201/12* (2022.01)

(56) References Cited

U.S. PATENT DOCUMENTS

| | | | |
|---|---|---|---|
| 2007/0150247 A1 | 6/2007 | Bodduluri | |
| 2012/0302882 A1* | 11/2012 | Sliwa | A61B 8/0858 600/439 |
| 2014/0192164 A1* | 7/2014 | Tenn | H04N 13/243 348/47 |
| 2019/0121522 A1* | 4/2019 | Davis | G06V 40/28 |
| 2021/0375029 A1* | 12/2021 | Mitchell | G06T 7/50 |

OTHER PUBLICATIONS

Qitong Zhang et al, "*A Robust Multi-View System for high-Fidelity Human body Shape Reconstruction*", Eurographics Symposium on Geometry Processing, vol. 40 (2021), No. 5.

Zheng Dong et al, "*Total Scale: Face-to Body Detail Reconstruction from Sparse RGBD Sensors*", arxiv.org, Cornell University Library, 201 Olin Library, Cornell University, Ithaca, NY 14853, XP091112922, Dec. 3, 2021.

Sugao Ma et al, "*Pixel Codec Avatars*", 2021 IEEE/CVF Conference on Computer Vision and Pattern Recognition (CVPR), XP034008330, Jun. 20, 2021.

\* cited by examiner

SYSTEM OF OBTAINING THREE-DIMENSIONAL (3D) SCAN OF BODY PART FROM MULTIPLE VIEWING DIRECTIONS AND PRESENTING AUGMENTED IMAGES ON DISPLAY UNIT

This application claims priority to PL Application No. P.441749 filed Jul. 16, 2022, the entire contents of which are hereby incorporated by reference.

FIELD

The invention relates to systems, methods and computer program products for obtaining a three-dimensional scan of a body part or a complete body.

BACKGROUND ART

Systems and methods for obtaining a three-dimensional (3D) scan of a body part or a complete body, such as a head, a part of a head, a body part or the complete body, may be used to, e.g., inspect part of the body part or the complete body. E.g., a dermatologist may want to inspect the skin of a human individual and monitor that over a period of time, especially when suspicious spots or damaged spots are to be monitored as to how they develop. In particular, there is a wish for high-resolution images for reliable inspection as well as for high-resolution images for better control of cosmetic treatment, such as hair implant, or therapeutic treatment, such as potentially malicious spots. High-resolution two-dimensional photographs are often used, but as inspection based on two-dimensional images may run into various limitations when inspecting structures on the skin, it has been proposed to also use three-dimensional scan systems.

Existing three-dimensional scan systems are known which obtain a series of two-dimensional, high-resolution images from rotating a camera around a body or body part, e.g., a head, and derive a three-dimensional visualization from those images. For example, the high-resolution images may be used to derive a high-resolution three-dimensional model of the head formed of a large variety of polygons with, e.g., sizes in a range of 1 to 5 mm$^2$, and wherein texture mapping is done from small parts of the two-dimensional images onto the polygons. However, such known approaches do not always give satisfactory results, e.g., because the texture mapping, which may require scaling, deforming, and patching the two-dimensional images, may cause many imperfections, and the forming of the three-dimensional model at a very high resolution may be problematic. For example, it may be difficult or even impossible to achieve a natural representation of human skin, and it may, e.g., have a plastic appearance rather than a natural appearance. When using such know approaches in, e.g., a cosmetic treatment, such types of skin appearance are unacceptable. Also known systems may have difficulties to provide a natural appearance of hair, which may again be caused by artefacts of the texture mapping. Further, for medical inspection and monitoring of, e.g., the skin surface for malicious or benign structures, or to monitor the development of a skin lesion or any skin area that has different characteristics from the surrounding skin, including color, shape, size, and texture, e.g., due to sunburns, contact dermatitis, or an otherwise abnormal growth or appearance compared to the skin around it, any change to the appearance of the relevant skin area may compromised the monitoring and may in some cases even make the differences invisible.

Also, in the area of cosmetic hair transplant, a 3D-scan and subsequent visualization may be used by known systems to show a 3D visualization of the complete head of a person, i.e., face, skin and hair, before the treatment and thereafter, where a standard approach is to obtain the 3D visualization using texture mapping on a high-resolution 3D model. However, the application of such standard approach to hair is difficult, for example because hair cannot be described with a smooth surface like skin, and modeling each individual hair as a 3D object build of multiple textured polygons is extremely resource demanding and impractical. In 3D-scan and visualization, any unnatural appearance of the face and other human skin may be perceived as so poor and unacceptable that the person concerned cannot get a good impression of the differences, and the person may be fully distracted by the poor face and skin quality. Thus, there is a wish to alleviate one or more of the above-mentioned limitations.

SUMMARY

A first aspect of the invention provides a system for obtaining a three-dimensional scan of a body part or a complete body, such as a head, a part of a head, a body part or the complete body, to enable inspection of at least a part of the body part or the complete body. The system comprises an image acquisition system, an image processor, an image interface, a user input processor and an augmenting unit. The system further comprises a display unit or is configured and arranged for cooperating with a display unit.

The image acquisition system is configured and arranged for obtaining a plurality of images from the body part or the complete body from a first plurality of first viewing directions and for obtaining a plurality of depth maps from the body part or the complete body from a second plurality of second viewing directions.

The image processor is configured and arranged for determining a three-dimensional (3D) model of the body part or the complete body from the plurality of images and/or the plurality of depth maps. The system may further relate positions in the images to positions on the 3D model. E.g., the system may relate positions in the images to positions on the 3D model from projection of the model on the image or vice versa, by using the viewing directions and positions from the various images and depth maps. E.g., the images and the 3D model may be divided into polygons, and the polygons of the images may be associated with polygons of the 3D model.

In embodiments, the image interface is configured and arranged for presenting a sequence of at least part of the plurality of images on the display unit for allowing a user to perceive a three-dimensional visualization of the body part or the complete body. In contrast to know systems, no texture mapping is used but rather the original images are displayed, whereby the high quality of the images is maintained, also when view with 3D perception. The 3D perception is obtained from sequentially showing the originally images of the body part, presented one at a time at successive viewing directions, e.g., at angles relative to the first image of 0°, 5°, 10°, 15°, 20°, . . . : with a sufficient plurality of images covering a complete wanted angular range, the 3D perception is already good, and no continuous coverage of any intermediate angle is needed. The plurality may, e.g., be in a range of 10-360 per 360°. For some applications, the plurality may be in a range of 10-180 per 360°; for some applications, a range of 30-90 per 360° may be used. In an embodiment, the presenting of the sequence of the at least part of the plurality of images on the display unit is only performed in response to a user request, while the presenting is suppressed in absence of a user request. In embodiments, the image interface is configured and arranged for presenting sequence of at least part of the plurality of images before obtaining the user input described below. In embodiments, the image interface is configured and arranged for presenting the sequence of the at least part of the plurality of images on the display unit only performed in response to a user request, while the presenting is suppressed in absence of a user request. In embodiments, the image interface is configured and arranged for presenting the sequence of at least part of the plurality of images in response to a user request. In embodiments, the image interface is configured and arranged for presenting the sequence of at least part of the plurality of images before obtaining the user input in absence of a user request to not present such sequence. In other embodiments, the image interface may be configured and arranged for presenting a sequence of at least part of the plurality of images on the display unit for allowing a user to perceive a three-dimensional visualization of the body part or the complete body only when at least part of the images of said sequence are augmented with augmented visual information as described below.

The user input processor is configured and arranged for obtaining a user input from the user and deriving augmented visual information from at least the user input and the three-dimensional model. Hereby, the user may, e.g., indicate a point of interest such as a potentially malicious structure, on an image that is being presented on the screen, whereby the system may create augmented visual information to provide a visual indicator on the screen than indicates the position of the point of interest on that image. The user input processor may further use the three-dimensional model to create augmented visual information for at least part of the plurality of images other than said image, e.g., to also provide the visual indicator indicating the position of the point of interest on the images of the at least part of the plurality of images other than said image.

The augmenting unit is configured and arranged for using the three-dimensional model and the augmented visual information to augment at least part of the plurality of images with the augmented visual information to obtain a plurality of augmented images. Hereby, the system may, to follow-up on the example above, create augmented visual information to provide a visual indicator not only in the image that the user used when providing the user input but also in other images, such that the structure cam be inspected from various directions with the system indicating its location. The augmented images may thus be considered to correspond to the original images with the augmented visual information added as an overlay.

The image interface is hereto configured and arranged for presenting a sequence of at least part of the plurality of augmented images on the display unit allowing the user or another user to perceive a three-dimensional visualization of the body part or the complete body as augmented with the augmented visual information. The other user may be a human, an artificial intelligence machine, a machine learning system, or an expert system that may inspect the sequence of at least part of the plurality of augmented images. As the augmented images may thus be considered to correspond to the original images with the augmented visual information added as an overlay, the full resolution of the original images is maintained, similar as described above when a sequence would be presented of at least part of the plurality of images on the display unit for allowing a user to perceive a three-dimensional visualization of the body part or the complete body. Hence, at least some of the disadvantages of the prior art methods, such as loss of resolution, poor appearance of natural skin, and alike, have been overcome. Further, whereas the prior art systems show the 3D model at full image resolution, the 3D model does not need to be shown to the user in the current system; in the current system, the 3D model may merely be used for linking the corresponding positions on the various high-resolution images together, so as to navigate between the images and so as to provide the augmented visual information at the correct positions in the images. Due to this function of the 3D model, the model may be as a lower resolution than the images themselves, and the perceived image quality is more robust against 3D model imperfections than known methods.

In embodiments, the first and second viewing directions may be the same, i.e., the system may use as many images as depth maps per angular range. In embodiments, the first and second viewing directions may be different. In embodiments, the first and second plurality may be the same. In embodiments, the first and second plurality may be different.

In an embodiment, the image processor is configured and arranged for determining the three-dimensional model of the body part or the complete body from the plurality of depth maps. This may allow for an efficient and high-quality depth map. The resulting model may hereby be derived directly from depth information as available from the depth maps only, in an efficient manner.

In an embodiment, the image acquisition system is configured and arranged for obtaining the plurality of images from the body part or the complete body from the first plurality of first viewing directions and for obtaining the plurality of depth maps from the body part or the complete body from the second plurality of second viewing directions by using two-dimensional to three-dimensional image conversion. As several techniques are known to create depth information from two-dimensional images which vary in viewing direction, the skilled person will not have difficulties to find such techniques and they are not described in more detail here. Hereby, the image processor is effectively configured and arranged for determining the three-dimensional model of the body part or the complete body from the plurality of images. This allows for an implementation with a depth sensor or a 3D-camera, which may be advantageous in some applications as less components are needed, but it may come with some more processing power.

In an embodiment, the image processor is configured and arranged for determining a three-dimensional model of the body part or the complete body from the plurality of images and the plurality of depth maps. The use of the combination of depth maps and high-resolution images may allow some other system design choices, such as a low-resolution depth map to create a relatively course depth resolution in itself, where the images are used to create a locally high-resolution depth map.

The plurality of images and the plurality of depth maps may be obtained from capturing images and capturing depth maps real-time, e.g., using a high-resolution camera and a depth sensor, e.g., by rotating a camera around the body part or the complete body. The camera may provide high-resolution images, such as for example images having a spatial resolution in a range of 1-50 megapixel, such as of 1-10 megapixel, such as in a range of 2-5 megapixel, for example of 6000×4000 pixels. The depth sensor may provide the same spatial resolution as the camera. The depth sensor may have a lower spatial resolution, such as in a range of 0.1-5 megapixel, such as in a range of 0.1-1 megapixel, for example 640×480 pixels.

The plurality of images and the plurality of depth maps may be obtained from a storage, also referred to as memory, where they have been stored previously. Obtaining them from storage may allow to compare with an earlier moment in time, e.g., to refer to an earlier situation such as a pre-intervention situation, e.g., in hair transplant, plastic surgery, or dermato surgery, when doing a 3D scan for evaluating the intervention results.

In an embodiment, the user input may relate to marking structures, spots or other points of interest in an image. E.g., the user may draw a wanted hairline when the user wants to let the system create augmented visual information that visualizes the effect of a hair implant according to a wanted hairline and/or its subsequent growth. As another example, the user may mark a single spot to let the system create a pointer or other indicator and show that indicator when viewing other images from other viewing directions to inspect the same spot on these other images.

In embodiments, user input processor is configured and arranged for, as part deriving augmented visual information from at least the user input and the three-dimensional model, deriving a visual indicator when the user input comprises an indication of a point of interest.

In embodiments, the user input processor is configured and arranged for, as part of deriving augmented visual information from at least the user input and the three-dimensional model, deriving implanted hair according to a hair implant scheme when the user input comprises parameters define a hair implant scheme, such as a hair line, a contour of a hair area.

In embodiments, the user input relates to an interaction on the screen with an image structure in an image of the plurality of images, such as a spot. In embodiments, the user input relates to an interaction on the screen with the, albeit non-visible, 3D model by interacting with the shown image.

In embodiments, the user input may include providing additional visual information such as microscopic images associated with a part of an image/a location on the part of the body.

The augmented images may thus be considered to correspond to the original images with the augmented visual information added as an overlay.

According to an embodiment of the system, the user input processor is configured and arranged for, as part of obtaining the user input from the user, receiving one or more spatial locations in a first image from the sequence of at least part of the plurality of images as the user input, and, the user input processor is configured and arranged for, as part of deriving augmented visual information from the user input and the three-dimensional model, deriving one or more location visualizer objects from the one or more spatial locations to derive at least part of the augmented visual information; and the augmenting unit is configured and arranged for, as part of using the three-dimensional model and the augmented visual information to augment at least part of the plurality of images with augmented visual information to obtain a plurality of augmented images, augmenting the at least part of the plurality of images with a visualization of the one or more location visualizer objects to obtain the at least part of plurality of augmented images and to indicate the one or more spatial locations as indicated in the first image in the at least part of the plurality of images.

According to a further embodiment of the system, wherein the one or more spatial locations indicate at least one item of a predetermined class, allowing to inspect the one or more spatial locations from various viewing directions from at least part of the plurality of augmented images. This may improve the quality of inspection of locations which appear to have an item of the predetermined class, allowing to determine the class with an improved reliability. E.g., the predetermined class may correspond to potentially malicious spots, allowing to inspect the potentially malicious spot/object from various angles/viewing directions.

According to an embodiment of the system, wherein the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information. The hairline may be different from a previously used hairline to be able to assess which implant strategy is preferred.

According to an embodiment of the system, the system comprises or is arranged to cooperate with the one or more cameras and the image acquisition system is configured and arranged for, as part of the obtaining the plurality of images, positioning the one or more cameras at a plurality of positions along a trajectory around the body part or the complete body and configured and arrange to use the one or more cameras to capture a plurality of images from the body part or the complete body from the first plurality of first viewing directions from the plurality of positions along the trajectory. The images may thus be obtained with a well-defined spatial relationship to each other, thus allowing a high-quality of the 3D scan. The trajectory may, e.g., be a circular trajectory around the body part or the complete body, whereby the distance to the body part or complete body may be kept substantially constant so that the images have substantially the same magnification of the body part or the complete body. The trajectory may have another suitable shape, such as for example an oval, for example when the body part has an elongated shape.

In an example, this relates to rotating a single camera at various positions along a circular trajectory around the body part or the complete body. In another example, this relates to positioning a plurality of cameras at various positions along a circular trajectory around the body part or the complete body.

According to a further embodiment of the system, the one or more cameras are further configured and arranged to provide depth information associated with each image of the plurality of images when capturing the images, so as to obtain the plurality of depth maps together with the plurality of images as a plurality of depth-enriched images. Said camera may be referred to as a 3D camera. The depth-enriched images may thus be obtained with a well-defined spatial relationship to each other with each depth-enriched image being provided with depth information, thus allowing a high-quality of the 3D scan including depth information.

According to an embodiment of the system, the image acquisition system comprises or is arranged to cooperate with one or more depth sensors and the image acquisition system is configured and arranged for, as part of the obtaining the plurality of depth maps, positioning the one or more depth sensors together with the one or more cameras at the plurality of positions along the trajectory and using the plurality of depth sensors to provide the plurality depth maps. The plurality of images may thus be obtained with a well-defined spatial relationship to each other and with a well-defined spatial relationship to the plurality of depth maps, thus allowing a high-quality of the 3D scan with depth information.

According to an embodiment of the system, the image acquisition system comprises or is arranged to cooperate with a depth sensor and the image acquisition system is configured and arranged for, as part of the obtaining the plurality of depth maps, positioning the depth sensor separate from the camera at a second plurality of positions along the trajectory and using the depth sensor to provide depth information to provide the plurality depth maps. The plurality of images may thus be obtained with a well-defined spatial relationship to each other and with a well-defined spatial relationship to the plurality of depth maps albeit at a different resolution around the trajectory, thus allowing a high-quality of the 3D scan with depth information. Such arrangement of camera and depth sensor may for example be useful when the camera and depth sensor have different field of view, and where the positioning of camera and depth sensor may be optimized for their different field of views. Additionally or alternatively, it may provide for more flexibility as to how to position the camera and depth sensor, e.g., in view of possible obstructions near the body part or body.

In a further embodiment, the obtaining may also comprise calibrating the positions of camera and depth sensor. Once calibrated, the relation between all positions of all cameras and all depth sensors is known, so it does not matter anymore that the imaging camera(s) and the depth sensor are not in the same positions.

According to an embodiment of the system, the image acquisition system comprises or is arranged to cooperate with the storage and [the image acquisition system is configured and arranged for, as part of the obtaining the plurality of images, retrieving at least the plurality of images from a storage wherein the plurality of images were previously stored and/or the image acquisition system is configured and arranged for, as part of the obtaining the plurality of depth maps, retrieving at least the plurality of depth maps from a storage wherein the plurality of depth maps were previously stored. This allows an offline analysis, e.g., an off-line diagnostics.

According to an embodiment of the system, the system is further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images. This may, e.g., allow a comparison of the augmented visualization of the body part with the reference images, such as, e.g., allowing to compare an effect of a simulated hair implant and hair growth on a scalp, presented as augmented visual information, with reference images from the scalp of the person. This may, e.g., allow to monitor a development of a specific location on the body part over time, where the augmented visual information may be a location indicator.

According to an embodiment of the system, the three-dimensional model of the body part or the complete body has a spatial resolution which is smaller than the spatial resolution of each of the image from the plurality of images by a reduction factor in a range of 3-100, such as 3-20, such as 5-10. Whereas known methods use a full resolution 3D-reconstruced image which may have artefacts and imperfections that reduce the quality of the 3D image, the current system and method use the three-dimensional model merely to link the various images from the plurality of images and the locations of structures therein and uses the images itself for presentation to a user, the current system and method are robust against imperfections or a lower resolution of the three-dimensional model. The spatial resolution of the three-dimensional body part may thus be smaller than the spatial resolution of each of the image, allowing less memory and processing resources.

According to an embodiment of the system, the augmenting unit is configured and arranged for, as part of using the three-dimensional model and the augmented visual information to augment at least part of the plurality of images with the augmented visual information to obtain a plurality of augmented images, using location information from the three-dimensional model to match a first location in a first image, a second location in the second image and an augmented location in the augmented visual information; and for augmenting the first image at the first location and the second location in the second image with the augmented visual information at the augmented location. Hereby, the augmented visual information is visible in both augmented images, to, e.g., identify and inspect the same location of a specific spot in both images.

According to an embodiment of the system, the augmented visual information corresponds to a change in characteristics of hair. For example, the change may be a change relative to the current/exiting state of the hair of the subject. As another example, the change may be a change relative to one or more previously augmented images. As again another example, the change may relate to hair at various lengths, hair at various positions of the hairline—effect of hair implant after implantation and in the future, allowing to adjust or approve the hair characteristics as proposed by a practitioner, e.g., a medical practitioner for therapeutic treatment, for cosmetic treatment, or for a esthetical treatment.

According to an embodiment of the system, the user input processor is configured and arranged for, as part of obtaining a user input from the user, relating a user input location, such as a click with a pointer device on a position on the display unit when the display unit presents the sequence of at least part of the plurality of images, to a position in the three-dimensional model associated with a position of an image feature on one image of the sequence of at least part of the plurality of images. According to this embodiment of the system, the user input processor is further configured and arranged for, as part of deriving augmented visual information from the user input and the three-dimensional model, using the position in the three-dimensional model to derive augmented visual information for at least part of other images of the sequence of at least part of the plurality of images. The user input location may, e.g., relate to a location of a possible malicious spot, and the augmented visual information may, e.g., relate to a visual indicator, such as an arrow, a circle or another symbol, and/or a textual label, such as a text balloon. The user input location may, e.g., relate to a wanted location of a cosmetic intervention, such as an indication of a hair line for a considered hair implant or a location of a pigmented spot that is considered for removal.

According to a second aspect, a method for obtaining a three-dimensional (3D) scan of a body part or a complete body, such as a head, a part of a head, a body part or the complete body, to enable inspection of at least a part of the body part or the complete body is provided.

The method comprises obtaining a plurality of images from the body part or the complete body from a first plurality of first viewing directions and a plurality of depth maps from the body part or the complete body from a second plurality of second viewing directions. In embodiments, the first and second viewing directions may be the same, i.e., the system may use as many images as depth maps per angular range. In embodiments, the first and second viewing directions may be different. In embodiments, the first and second plurality may be the same. In embodiments, the first and second plurality may be different.

The method comprises determining a three-dimensional model of the body part or the complete body from the plurality of images and/or plurality of depth maps. The method may further relate positions in the images to positions on the 3D model. E.g., the method may relate positions in the images to positions on the 3D model from projection of the model on the image or vice versa, by using the viewing directions and positions from the various images and depth maps. E.g., the images and the 3D model may be divided into polygons, and the polygons of the images may be associated with polygons of the 3D model.

The method may comprise presenting a sequence of at least part of the plurality of images allowing a user to perceive a three-dimensional visualization of the body part or the complete body. In contrast to know methods, no texture mapping is used but rather the original images are displayed, whereby the high quality of the images is maintained, also when view with 3D perception. The 3D perception is obtained from sequentially showing the originally images of the body part, presented one at a time at successive viewing directions, e.g., at angles relative to the first image of 0°, 5°, 10°, 15°, 20°, . . . : with a sufficient plurality of images covering a complete wanted angular range, the 3D perception is already good, and no continuous coverage of any intermediate angle is needed. The plurality may, e.g., be in a range of 10-360 per 360°. For some applications, the plurality may be in a range of 10-180 per 360'; for some applications, a range of 30-90 per 360° may be used.

In embodiments, the presenting of the sequence of the at least part of the plurality of images on the display unit is only performed in response to a user request, while the presenting is suppressed in absence of a user request.

In embodiments, the method comprises presenting a sequence of at least part of the plurality of images allowing a user to perceive a three-dimensional visualization of the body part or the complete body before obtaining the user input.

In embodiments, the method comprises presenting a sequence of at least part of the plurality of images allowing a user to perceive a three-dimensional visualization of the body part or the complete body in response to a user request.

In embodiments, the method comprises presenting a sequence of at least part of the plurality of images allowing a user to perceive a three-dimensional visualization of the body part or the complete body in absence of a user request to not present such sequence.

In embodiments, the method does not comprises presenting a sequence of at least part of the plurality of images allowing a user to perceive a three-dimensional visualization of the body part or the complete body before obtaining a user input.

In embodiments, the method comprises presenting a sequence of at least part of the plurality of images on the display unit for allowing a user to perceive a three-dimensional visualization of the body part or the complete body only when at least part of the images of said sequence are augmented with augmented visual information as described below.

The method comprises obtaining a user input from the user and deriving augmented visual information from at least the user input and the three-dimensional model.

Hereby, the user may, e.g., indicate a point of interest such as a potentially malicious structure, on an image that is being presented on the screen, whereby the method may create augmented visual information to provide a visual indicator on the screen than indicates the position of the point of interest on that image. The user input processor may further use the three-dimensional model to create augmented visual information for at least part of the plurality of images other than said image, e.g., to also provide the visual indicator indicating the position of the point of interest on the images of the at least part of the plurality of images other than said image.

The method comprises using the three-dimensional model and the augmented visual information to augment at least part of the plurality of images with the augmented visual information to obtain a plurality of augmented images.

Hereby, the method may, to follow-up on the example above, create augmented visual information to provide a visual indicator not only in the image that the user used when providing the user input but also in other images, such that the structure cam be inspected from various directions with the system indicating its location. The augmented images may thus be considered to correspond to the original images with the augmented visual information added as an overlay.

The method comprises presenting a sequence of at least part of the plurality of augmented images allowing the user or another user to perceive a three-dimensional visualization of the body part or the complete body as augmented with the augmented visual information. The other user may be a human, an artificial intelligence machine, a machine learning system, or an expert system that may inspect the sequence of at least part of the plurality of augmented images. As the augmented images may thus be considered to correspond to the original images with the augmented visual information added as an overlay, the full resolution of the original images is maintained. Hence, at least some of the disadvantages of the prior art methods, such as loss of resolution, poor appearance of natural skin, and alike, have been overcome. Further, whereas the prior art methods show the 3D model at full image resolution, the 3D model does not need to be shown to the user with the current method: in the current method, the 3D model may merely be used for linking the corresponding positions on the various high-resolution images together, so as to navigate between the images and so as to provide the augmented visual information at the correct positions in the images. Due to this function of the 3D model, the model may be as a lower resolution than the images themselves, and the perceived image quality is more robust against 3D model imperfections than known methods.

According to an embodiment of the method, obtaining a user input from the user comprises receiving one or more spatial locations in a first image from the sequence of at least part of the plurality of images as the user input. According to this embodiment, deriving augmented visual information from the user input comprises deriving one or more location visualizer objects from the one or more spatial locations to derive at least part of the augmented visual information. According to this embodiment, using the three-dimensional model and the augmented visual information to augment at least part of the plurality of images with augmented visual information to obtain a plurality of augmented images comprises augmenting the at least part of the plurality of images with a visualization of the one or more location visualizer objects to obtain the at least part of plurality of augmented images and to indicate the one or more spatial locations as indicated in the first image in the at least part of the plurality of images.

According to a further embodiment of the method the one or more spatial locations indicate at least one item of a predetermined class, allowing to inspect the one or more spatial locations from various viewing directions from at least part of the plurality of augmented images. This may improve the quality of inspection of locations which appear to have an item of the predetermined class, allowing to determine the class with an improved reliability. E.g., the predetermined class may correspond to potentially malicious spots, allowing to inspect the potentially malicious spot/object from various angles/viewing directions.

According to an embodiment of the method, the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information. The hairline may be different from a previously used hairline to be able to assess which implant strategy is preferred.

According to an embodiment of the method, the obtaining the plurality of images comprises positioning one or more cameras at a plurality of positions along a, e.g., circular, trajectory around the body part or the complete body and configured and arrange to use the camera to capture a plurality of images from the body part or the complete body from a first plurality of first viewing directions from the plurality of positions along the trajectory. In this embodiment, the system comprises or is arranged to cooperate with the one or more cameras. The images may thus be obtained with a well-defined spatial relationship to each other, thus allowing a high-quality of the 3D scan.

In an example, this relates to rotating a single camera at various positions along a circular trajectory around the body part or the complete body. In another example, this relates to positioning a plurality of cameras at various positions along a circular trajectory around the body part or the complete body.

According to an embodiment of the method, one or more cameras are further configured and arranged to provide depth information associated with each image of the plurality of images when capturing the images, so as to obtain the plurality of depth maps together with the plurality of images as a plurality of depth-enriched images. Said camera may be referred to as a 3D camera. The depth-enriched images may thus be obtained with a well-defined spatial relationship to each other with each depth-enriched image being provided with depth information, thus allowing a high-quality of the 3D scan including depth information.

According to an embodiment of the method, the obtaining the plurality of depth maps comprises positioning one or more depth sensors together with the one or more cameras at the plurality of positions along the trajectory and using the plurality of depth sensors to provide the plurality depth maps. In this embodiment, the image acquisition system comprises or is arranged to cooperate with the one or more depth sensors. The plurality of images may thus be obtained with a well-defined spatial relationship to each other and with a well-defined spatial relationship to the plurality of depth maps, thus allowing a high-quality of the 3D scan with depth information.

According to an embodiment of the method, the obtaining the plurality of depth maps comprises positioning a depth sensor separate from the camera at a second plurality of positions along the trajectory and using the depth sensor to provide depth information to provide the plurality depth maps. In this embodiment, wherein the image acquisition system comprises or is arranged to cooperate with the depth sensor. The plurality of images may thus be obtained with a well-defined spatial relationship to each other and with a well-defined spatial relationship to the plurality of depth maps albeit at a different resolution around the trajectory, thus allowing a high-quality of the 3D scan with depth information. Such arrangement of camera and depth sensor may for example be useful when the camera and depth sensor have different field of view, and where the positioning of camera and depth sensor may be optimized for their different field of views. Additionally or alternatively, it may provide for more flexibility as to how to position the camera and depth sensor, e.g., in view of possible obstructions near the body part or body.

In a further embodiment of the method, the obtaining may also comprise calibrating the positions of camera and depth sensor. Once calibrated, the relation between all positions of all cameras and all depth sensors is known, so it does not matter anymore that the imaging camera(s) and the depth sensor are not in the same positions.

According to an embodiment of the method, the obtaining the plurality of images comprises retrieving at least the plurality of images from a storage wherein the plurality of images were previously stored and/or obtaining the plurality of depth maps comprises retrieving at least the plurality of depth maps from a storage wherein the plurality of depth maps were previously stored. In this embodiment, the image acquisition system comprises or is arranged to cooperate with the storage. This allows an offline analysis, e.g., an off-line diagnostics.

According to an embodiment of the method, the system or method is further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images. This may, e.g., allow a comparison of the augmented visualization of the body part with the reference images, such as, e.g., allowing to compare an effect of a simulated hair implant and hair growth on a scalp, presented as augmented visual information, with reference images from the scalp of the person. This may, e.g., allow to monitor a development of a specific location on the body part over time, where the augmented visual information may be a location indicator.

According to an embodiment of the method, the three-dimensional model of the body part or the complete body has a spatial resolution which is smaller than the spatial resolution of each of the image from the plurality of images by a reduction factor in a range of 3-100, such as 3-20, such as 5-10. Whereas known methods use a full resolution 3D-reconstructed image which may have artefacts and imperfections that reduce the quality of the 3D image, the current system and method use the three-dimensional model merely to link the various images from the plurality of images and the locations of structures therein and uses the images itself for presentation to a user, the current system and method are robust against imperfections or a lower resolution of the three-dimensional model. The spatial resolution of the three-dimensional body part may thus be smaller than the spatial resolution of each of the image, allowing less memory and processing resources.

According to an embodiment of the method, using the three-dimensional model and the augmented visual information to augment at least part of the plurality of images with the augmented visual information to obtain a plurality of augmented images comprises: using location information from the three-dimensional model to match a first location in a first image, a second location in the second image and an augmented location in the augmented visual information; and to augment the first image at the first location and the second location in the second image with the augmented visual information at the augmented location. Hereby, the augmented visual information is visible in both augmented images, to, e.g., identify and inspect the same location of a specific spot in both images.

According to an embodiment of the method, [the augmented visual information corresponds to a change in characteristics of hair. For example, the change may be a change relative to the current/exiting state of the hair of the subject. As another example, the change may be a change relative to one or more previously augmented images. As again another example, the change may relate to hair at various lengths, hair at various positions of the hairline—effect of hair implant after implantation and in the future, allowing to adjust or approve the hair characteristics as proposed by a practitioner, e.g., a medical practitioner for therapeutic treatment, for cosmetic treatment, or for a esthetical treatment.

According to an embodiment of the method, obtaining a user input from the user comprises relating a user input location, such as a click with a pointer device on a position on the display unit when the display unit presents the sequence of at least part of the plurality of images, to a position in the three-dimensional model associated with a position of an image feature on one image of the sequence of at least part of the plurality of images, and wherein deriving augmented visual information from at least the user input and the three-dimensional model uses the position in the three-dimensional model to derive augmented visual information for at least part of other images of the sequence of at least part of the plurality of images. The user input location may, e.g., relate to a location of a possible malicious spot, and the augmented visual information may, e.g., relate to a visual indicator, such as an arrow, a circle or another symbol, and/or a textual label, such as a text balloon. The user input location may, e.g., relate to a wanted location of a cosmetic intervention, such as an indication of a hair line for a considered hair implant or a location of a pigmented spot that is considered for removal.

A third aspect provides, a computer program product comprising a computer program comprising instructions arranged to, when executed by a computer, execute at least part of one of the methods described above.

The various embodiments described above may be used autonomously or in combination of one or more embodiments described above, specific embodiments listed below and the embodiments described further below, e.g., with reference to the drawings. The embodiments described may overcome, reduce or alleviate various limitations of known techniques. The specific limitation or limitations that are overcome, reduced or alleviated by a specific embodiment may be different for the different embodiments and any combinations thereof.

Itemized List of Specific Embodiments

1. A system for obtaining a three-dimensional (3D) scan of a body part or a complete body, such as a head, a part of a head, a body part or the complete body, to enable inspection of at least a part of the body part or the complete body, the system comprising an image acquisition system, an image processor, an image interface, a user input processor and an augmenting unit, and the system further comprising or being configured and arranged for cooperating with a display unit:
  the image acquisition system being configured and arranged for obtaining a plurality of images from the body part or the complete body from a first plurality of first viewing directions and for obtaining a plurality of depth maps from the body part or the complete body from a second plurality of second viewing directions,
  the image processor being configured and arranged for determining a three-dimensional model of the body part or the complete body from the plurality of images and/or the plurality of depth maps,
  the user input processor being configured and arranged for obtaining a user input from the user and deriving augmented visual information from at least the user input and the three-dimensional model,
  the augmenting unit being configured and arranged for using the three-dimensional model and the augmented visual information to augment at least part of the plurality of images with the augmented visual information to obtain a plurality of augmented images, and
  the image interface being configured and arranged for presenting a sequence of at least part of the plurality of augmented images on the display unit allowing the user or another user to perceive a three-dimensional visualization of the body part or the complete body as augmented with the augmented visual information.

2. A method for obtaining a three-dimensional (3D) scan of a body part or a complete body, such as a head, a part of a head, a body part or the complete body, to enable inspection of at least a part of the body part or the complete body, the method comprising:
  Obtaining a plurality of images from the body part or the complete body from a first plurality of first viewing directions and a plurality of depth maps from the body part or the complete body from a second plurality of second viewing directions,
  Determining a three-dimensional model of the body part or the complete body from the plurality of images and/or plurality of depth maps,
  Obtaining a user input from the user and deriving augmented visual information from at least the user input and the three-dimensional model,
  Using the three-dimensional model and the augmented visual information to augment at least part of the plurality of images with the augmented visual information to obtain a plurality of augmented images, and
  Presenting a sequence of at least part of the plurality of augmented images allowing the user or another user to perceive a three-dimensional visualization of the body part or the complete body as augmented with the augmented visual information.

3. A system according to item 1, wherein the image interface is further configured and arranged for presenting a sequence of at least part of the plurality of images on the display unit (DISP) for allowing a user to perceive a three-dimensional visualization of the body part or the complete body.

4. A method according to item 2, the method further comprising presenting (M_IIF_IM) a sequence of at least part of the plurality of images allowing a user to perceive a three-dimensional visualization of the body part or the complete body.

5. A system according to item 1 or 3 or a method according to item 2 or 4,
wherein obtaining a user input from the user comprises:
receiving one or more spatial locations in a first image from the sequence of at least part of the plurality of images as the user input,
wherein deriving augmented visual information from the user input comprises:
deriving one or more location visualizer objects from the one or more spatial locations to derive at least part of the augmented visual information, and
wherein using the three-dimensional model and the augmented visual information to augment at least part of the plurality of images with augmented visual information to obtain a plurality of augmented images comprises:
augmenting the at least part of the plurality of images with a visualization of the one or more location visualizer objects to obtain the at least part of plurality of augmented images and to indicate the one or more spatial locations as indicated in the first image in the at least part of the plurality of images.

6. A system or method according to item 5, wherein the one or more spatial locations indicate at least one item of a predetermined class, allowing to inspect the one or more spatial locations from various viewing directions from at least part of the plurality of augmented images.

7. A system or method according to item 5, wherein the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information.

8. A system or method according to any one of the preceding items, wherein the obtaining the plurality of images comprises positioning one or more cameras at a plurality of positions along a trajectory around the body part or the complete body and configured and arrange to use the camera to capture a plurality of images from the body part or the complete body from the first plurality of first viewing directions from the plurality of positions along the trajectory, and, as far as dependent on item 1, wherein the system comprises or is arranged to cooperate with the one or more cameras.

9. A system or method according to item 8, wherein one or more cameras are further configured and arranged to provide depth information associated with each image of the plurality of images when capturing the images, so as to obtain the plurality of depth maps together with the plurality of images as a plurality of depth-enriched images.

10. A system or method according to item 8, wherein the obtaining the plurality of depth maps comprises positioning one or more depth sensors together with the one or more cameras at the plurality of positions along the trajectory and using the plurality of depth sensors to provide the plurality depth maps,
and, as far as dependent on item 1, wherein the image acquisition system comprises or is arranged to cooperate with the one or more depth sensors.

11. A system or method according to item 8, wherein the obtaining the plurality of depth maps comprises positioning a depth sensor separate from the camera at a second plurality of positions along the trajectory and using the depth sensor to provide depth information to provide the plurality depth maps,
and, as far as dependent on item 1, wherein the image acquisition system comprises or is arranged to cooperate with the depth sensor.

12. A system or method according to any one of the preceding items, wherein the obtaining the plurality of images comprises retrieving at least the plurality of images from a storage wherein the plurality of images were previously stored and/or obtaining the plurality of depth maps comprises retrieving at least the plurality of depth maps from a storage wherein the plurality of depth maps were previously stored,
and, as far as dependent on item 1, wherein the image acquisition system comprises or is arranged to cooperate with the storage.

13. A system or method according to any one of the preceding items, further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images.

14. A system or method according to any one of the preceding items, wherein the three-dimensional model of the body part or the complete body has a spatial resolution which is smaller than the spatial resolution of each of the image from the plurality of images by a reduction factor in a range of 3-100, such as 3-20, such as 5-10.

15. A system or method according to any one of the preceding items, wherein using the three-dimensional model and the augmented visual information to augment at least part of the plurality of images with the augmented visual information to obtain a plurality of augmented images comprises:
using location information from the three-dimensional model to match a first location in a first image, a second location in the second image and an augmented location in the augmented visual information; and
to augment the first image at the first location and the second location in the second image with the augmented visual information at the augmented location.

16. A system or method according to item 15, wherein the augmented visual information corresponds to a change in characteristics of hair.

17. A system or method according to any one of the preceding items, wherein obtaining a user input from the user comprises relating a user input location, such as a click with a pointer device on a position on the display unit when the display unit presents the sequence of at least part of the plurality of images, to a position in the three-dimensional model associated with a position of an image feature on one image of the sequence of at least part of the plurality of images, and wherein deriving augmented visual information from at least the user input and the three-dimensional model uses the position in the three-dimensional model to derive augmented visual information for at least part of other images of the sequence of at least part of the plurality of images.

18. A computer program product comprising a computer program comprising instructions arranged to, when executed by a computer, execute at least part of one of the methods according to any one of items 2-17.

Itemized List of Specific Embodiments of Systems

S1. A system for obtaining a three-dimensional (3D) scan of a body part or a complete body, such as a head, a part of a head, a body part or the complete body, to enable inspection of at least a part of the body part or the complete body, the system comprising an image acquisition system, an image processor, an image interface, a user input processor and an augmenting unit, and the system further comprising or being configured and arranged for cooperating with a display unit:
- the image acquisition system being configured and arranged for obtaining a plurality of images from the body part or the complete body from a first plurality of first viewing directions and for obtaining a plurality of depth maps from the body part or the complete body from a second plurality of second viewing directions,
- the image processor being configured and arranged for determining a three-dimensional model of the body part or the complete body from the plurality of images and/or the plurality of depth maps,
- the user input processor being configured and arranged for obtaining a user input from the user and deriving augmented visual information from at least the user input and the three-dimensional model,
- the augmenting unit being configured and arranged for using the three-dimensional model and the augmented visual information to augment at least part of the plurality of images with the augmented visual information to obtain a plurality of augmented images, and
- the image interface being configured and arranged for presenting a sequence of at least part of the plurality of augmented images on the display unit allowing the user or another user to perceive a three-dimensional visualization of the body part or the complete body as augmented with the augmented visual information.

S2. A system according to item S1, wherein the image interface is further configured and arranged for presenting a sequence of the plurality of images on the display unit for allowing a user to perceive a three-dimensional visualization of the body part or the complete body.

S3. A system according to item S1, wherein the image interface is further configured and arranged for presenting a sequence of at least part of the plurality of images on the display unit for allowing a user to perceive a three-dimensional visualization of the body part or the complete body.

S4. A system according to item S1, wherein the image interface is further configured and arranged for presenting a sequence of at least part of the plurality of images on the display unit for allowing a user to perceive a three-dimensional visualization of the body part or the complete body only when at least part of the images of said sequence are augmented with augmented visual information.

S5. A system according to any one of items S1 to S4, wherein the user input processor is configured and arranged for, as part of obtaining the user input from the user:
- receiving one or more spatial locations in a first image from the sequence of at least part of the plurality of images as the user input, wherein the user input processor is configured and arranged for, as part of deriving augmented visual information from the user input and the three-dimensional model:
- deriving one or more location visualizer objects from the one or more spatial locations to derive at least part of the augmented visual information, and the augmenting unit is configured and arranged for, as part of using the three-dimensional model and the augmented visual information to augment at least part of the plurality of images with augmented visual information to obtain a plurality of augmented images:
- augmenting the at least part of the plurality of images with a visualization of the one or more location visualizer objects to obtain the at least part of plurality of augmented images and to indicate the one or more spatial locations as indicated in the first image in the at least part of the plurality of images.

S6. A system according to item S5, wherein the one or more spatial locations indicate at least one item of a predetermined class, allowing to inspect the one or more spatial locations from various viewing directions from at least part of the plurality of augmented images.

S7. A system according to item S5, wherein the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information.

S8. A system according to any one of items S1 to S7, wherein the system comprises or is arranged to cooperate with one or more cameras and the image acquisition system is configured and arranged for, as part of the obtaining the plurality of images, positioning the one or more cameras at a plurality of positions along a trajectory around the body part or the complete body and configured and arrange to use the one or more cameras to capture a plurality of images from the body part or the complete body from the first plurality of first viewing directions from the plurality of positions along the trajectory.

S9. A system according to item S8, wherein the one or more cameras are further configured and arranged to provide depth information associated with each image of the plurality of images when capturing the images, so as to obtain the plurality of depth maps together with the plurality of images as a plurality of depth-enriched images.

S10. A system according to item S8, wherein the image acquisition system comprises or is arranged to cooperate with one or more depth sensors and wherein the image acquisition system is configured and arranged for, as part of the obtaining the plurality of depth maps, positioning the one or more depth sensors together with the one or more cameras at the plurality of positions along the trajectory and using the plurality of depth sensors to provide the plurality depth maps.

S11. A system according to item S8, wherein the image acquisition system comprises or is arranged to cooperate with a depth sensor and wherein the image acquisition system is configured and arranged for, as part of the obtaining the plurality of depth maps, positioning the depth sensor separate from the camera at a second plurality of positions along the trajectory and using the depth sensor to provide depth information to provide the plurality depth maps.

S12. A system according to any one of items S1 to S11, wherein the image acquisition system comprises or is arranged to cooperate with a storage and wherein the image acquisition system is configured and arranged for, as part of the obtaining the plurality of images, retrieving at least the plurality of images from the storage wherein the plurality of images were previously stored and/or obtaining the plurality of depth maps comprises retrieving at least the plurality of depth maps from the storage wherein the plurality of depth maps were previously stored.

S13. A system according to any one of items S1 to S12, further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images.

S14. A system according to any one of items S1 to S13, wherein the three-dimensional model of the body part or the complete body has a spatial resolution which is smaller than the spatial resolution of each of the image from the plurality of images by a reduction factor in a range of 3-100, such as 3-20, such as 5-10.

S15. A system according to any one of items S1 to S14, wherein the augmenting unit is configured and arranged for, as part of using the three-dimensional model and the augmented visual information to augment at least part of the plurality of images with the augmented visual information to obtain a plurality of augmented images:
   using location information from the three-dimensional model to match a first location in a first image, a second location in the second image and an augmented location in the augmented visual information; and
   augmenting the first image at the first location and the second location in the second image with the augmented visual information at the augmented location.

S16. A system according to item S15, wherein the augmented visual information corresponds to a change in characteristics of hair.

S17. A system according to any one of items S1 to S16, wherein the user input processor is configured and arranged for, as part of obtaining a user input from the user, relating a user input location, such as a click with a pointer device on a position on the display unit when the display unit presents the sequence of at least part of the plurality of images, to a position in the three-dimensional model associated with a position of an image feature on one image of the sequence of at least part of the plurality of images, and wherein the user input processor is configured and arranged for, as part of deriving augmented visual information from the user input and the three-dimensional model, using the position in the three-dimensional model to derive augmented visual information for at least part of other images of the sequence of at least part of the plurality of images.

S18. A computer program product comprising a computer program comprising instructions arranged to, when executed by a processor comprised in a system for obtaining a three-dimensional scan of a body part or a complete body, execute at least part of one of the steps defined in any one of items S2-S17.

Itemized List of Specific Embodiments of Methods and Computer-Implemented Aspects M1. A method for obtaining a three-dimensional (3D) scan of a body part or a complete body, such as a head, a part of a head, a body part or the complete body, to enable inspection of at least a part of the body part or the complete body, the method comprising:
   obtaining a plurality of images from the body part or the complete body from a first plurality of first viewing directions and a plurality of depth maps from the body part or the complete body from a second plurality of second viewing directions,
   determining a three-dimensional model of the body part or the complete body from the plurality of images and/or plurality of depth maps,
   obtaining a user input from the user and deriving augmented visual information from at least the user input and the three-dimensional model,
   using the three-dimensional model and the augmented visual information to augment at least part of the plurality of images with the augmented visual information to obtain a plurality of augmented images, and
   presenting a sequence of at least part of the plurality of augmented images allowing the user or another user to perceive a three-dimensional visualization of the body part or the complete body as augmented with the augmented visual information.

M2. A method according to item M1, the method further comprising presenting a sequence of the plurality of images allowing a user to perceive a three-dimensional visualization of the body part or the complete body.

M3. A method according to item M1, the method further comprising presenting a sequence of at least part of the plurality of images allowing a user to perceive a three-dimensional visualization of the body part or the complete body.

M4. A method according to item M1, the method further comprising presenting a sequence of at least part of the plurality of images on the display unit for allowing a user to perceive a three-dimensional visualization of the body part or the complete body only when at least part of the images of said sequence are augmented with augmented visual information.

M5. A method according to any one of items M1 to M4, wherein obtaining a user input from the user comprises:
   receiving one or more spatial locations in a first image from the sequence of at least part of the plurality of images as the user input,
   wherein deriving augmented visual information from the user input comprises:
   deriving one or more location visualizer objects from the one or more spatial locations to derive at least part of the augmented visual information, and
   wherein using the three-dimensional model and the augmented visual information to augment at least part of the plurality of images with augmented visual information to obtain a plurality of augmented images comprises:
   augmenting the at least part of the plurality of images with a visualization of the one or more location visualizer objects to obtain the at least part of plurality of augmented images and to indicate the one or more spatial locations as indicated in the first image in the at least part of the plurality of images.

M6. A method according to item M5, wherein the one or more spatial locations indicate at least one item of a predetermined class, allowing to inspect the one or more spatial locations from various viewing directions from at least part of the plurality of augmented images.

M7. A method according to item M5, wherein the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information.

M8. A method according to any one of items M1 to M7, wherein the obtaining the plurality of images comprises positioning one or more cameras at a plurality of positions along a trajectory around the body part or the complete body and configured and arrange to use the camera to capture a plurality of images from the body part or the complete body from the first plurality of first viewing directions from the plurality of positions along the trajectory.

M9. A method according to item M8, wherein one or more cameras are further configured and arranged to provide depth information associated with each image of the plurality of images when capturing the images, so as to obtain the plurality of depth maps together with the plurality of images as a plurality of depth-enriched images.

M10. A method according to item M8, wherein the obtaining the plurality of depth maps comprises positioning one or more depth sensors together with the one or more cameras at the plurality of positions along the trajectory and using the plurality of depth sensors to provide the plurality depth maps.

M11. A method according to item M8, wherein the obtaining the plurality of depth maps comprises positioning a depth sensor separate from the camera at a second plurality of positions along the trajectory and using the depth sensor to provide depth information to provide the plurality depth maps.

M12. A method according to any one of items M1 to M11, wherein the obtaining the plurality of images comprises retrieving at least the plurality of images from a storage wherein the plurality of images were previously stored and/or obtaining the plurality of depth maps comprises retrieving at least the plurality of depth maps from a storage wherein the plurality of depth maps were previously stored.

M13. A method according to any one of items M1 to M12, further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images.

M14. A method according to any one of items M1 to M13, wherein the three-dimensional model of the body part or the complete body has a spatial resolution which is smaller than the spatial resolution of each of the image from the plurality of images by a reduction factor in a range of 3-100, such as 3-20, such as 5-10.

M15. A method according to any one of items M1 to M14, wherein using the three-dimensional model and the augmented visual information to augment at least part of the plurality of images with the augmented visual information to obtain a plurality of augmented images comprises:
  using location information from the three-dimensional model to match a first location in a first image, a second location in the second image and an augmented location in the augmented visual information; and
  to augment the first image at the first location and the second location in the second image with the augmented visual information at the augmented location.

M16. A method according to item M15, wherein the augmented visual information corresponds to a change in characteristics of hair.

M17. A method according to any one of the preceding items M1 to M17, wherein obtaining a user input from the user comprises relating a user input location, such as a click with a pointer device on a position on the display unit when the display unit presents the sequence of at least part of the plurality of images, to a position in the three-dimensional model associated with a position of an image feature on one image of the sequence of at least part of the plurality of images, and wherein deriving augmented visual information from at least the user input and the three-dimensional model uses the position in the three-dimensional model to derive augmented visual information for at least part of other images of the sequence of at least part of the plurality of images.

M18. A computer program product comprising a computer program comprising instructions arranged to, when executed by a computer, execute at least part of one of the methods according to any one of items M1-M17.

M19. A computer program product comprising a computer program comprising instructions arranged to, when executed by a computer, execute at least the actions of:
  obtaining a plurality of images from a body part or a complete body from a first plurality of first viewing directions and a plurality of depth maps from the body part or the complete body from a second plurality of second viewing directions,
  determining a three-dimensional model of the body part or the complete body from the plurality of images and/or plurality of depth maps,
  obtaining a user input from the user and deriving augmented visual information from at least the user input and the three-dimensional model,
  using the three-dimensional model and the augmented visual information to augment at least part of the plurality of images with the augmented visual information to obtain a plurality of augmented images, and
  providing the plurality of augmented images to allow presenting a sequence of at least part of the plurality of augmented images for allowing a user to perceive a three-dimensional visualization of the body part or the complete body as augmented with the augmented visual information.

M20. A computer program product according to item M19 wherein the computer program comprises further instructions arranged to, when executed by a computer, execute a further action of presenting the sequence of at least part of the plurality of augmented images on a display unit.

M21. A computer program product according to item M19 or M20 wherein the computer program comprises further instructions arranged to, when executed by a computer, execute one or more further actions as defined in any of items M1-M17.

BRIEF DESCRIPTION OF THE DRAWINGS

These and other aspects of the invention are apparent from and will be elucidated with reference to the embodiments described hereinafter. In the drawings, FIG. 1 schematically illustrate elements of a use of a system and method for obtaining a three-dimensional scan of a body part or a complete body, such as a head, a part of a head, a body part or the complete body, to enable inspection of at least a part of the body part or the complete body.

It should be noted that items which have the same reference numbers in different Figures, have the same or corresponding structural features and the same or corresponding functions, or are the same or corresponding signals. Where the function and/or structure of such an item has been explained, there is no necessity for repeated explanation thereof in the detailed description.

DETAILED DESCRIPTION

Figure 1:
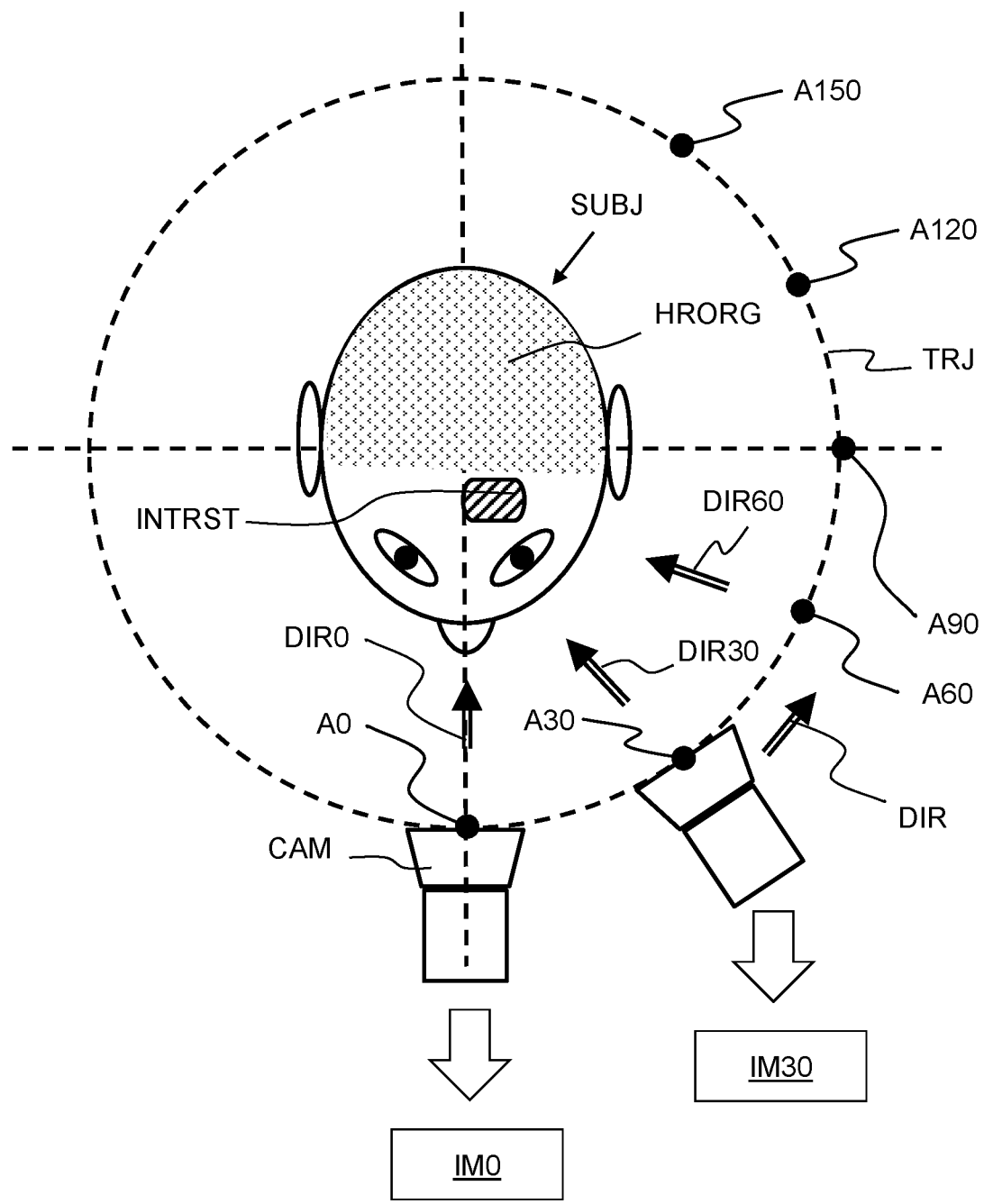

FIG. 1 schematically illustrate elements of a use of a system and method for obtaining a three-dimensional scan of a body part or a complete body, such as a head, a part of a head, a body part or the complete body, to enable inspection of at least a part of the body part or the complete body. In this and other figures, a schematical illustration of a head will be used for an easy understanding; it will be understood that any reference to a "head" may be understood to refer to a "part of a head, another body part or a complete body". The term "body part" may be refer to "part of the body".

FIG. 1 schematically shows a head SUBJ of a huma subject, a camera CAM of an image acquisition system, and a trajectory TRJ. The head SUBJ has an area HRORG of an original hair condition, which may relate to, e.g., thin hair or to a bold scalp. The head SUBJ has a feature of interest INTST, which may relate to an item of a predetermined class, such as a predetermined class of possible malicious features of a certain type, such as for example a possible melanoma.

FIG. 1 schematically shows that camera CAM is configured and arranged for obtaining a plurality of images IMO, IM30 from the head SUBJ from a first plurality of first viewing directions DIR0, DIR30, DIR60. Hereto, the camera CAM is positioned at a plurality of positions A0, A30, A60, A90, A120, A150 in a direction DIR along a trajectory TRJ around the body part SUBJ. The camera CAM is configured and arrange to capture a plurality of images IM0, IM30 from the heads SUBJ from the plurality of viewing directions from the plurality of positions A0, A30, A60, A90, A120, A150 along the trajectory TRJ.

Figure 10A:
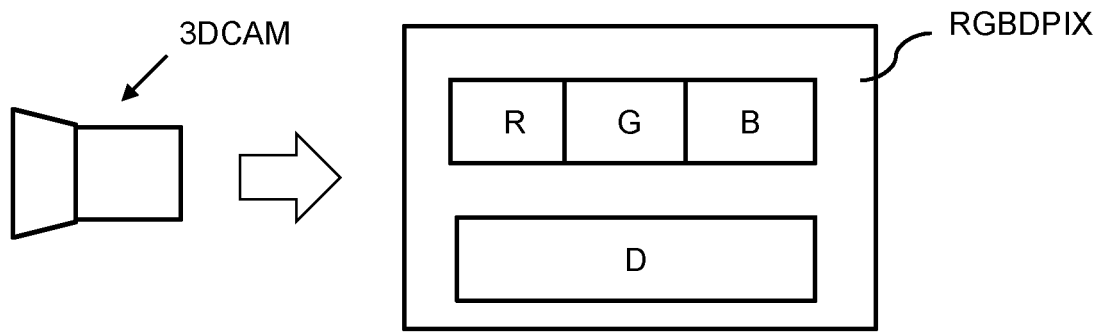
FIG. 10a and FIG. 10b schematically illustrate two examples of acquiring images and depth maps.
Figure 10B:
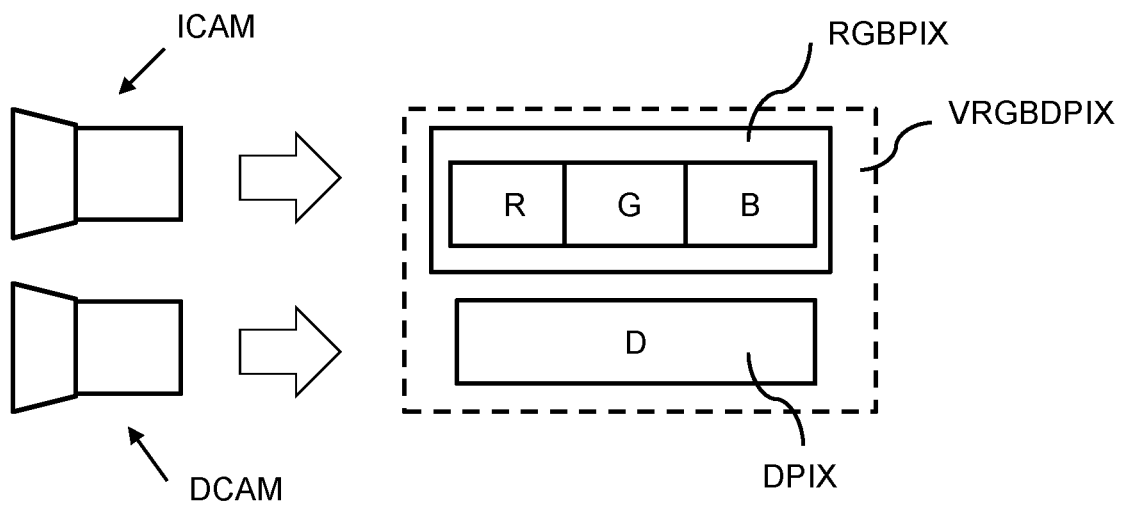

In this embodiment, the camera CAM is a 3D camera—referred to as 3DCAM in FIG. 10a—, which is further configured and arranged to provide depth information associated with each image IM0, IM30 of the plurality of images when capturing the images, so as to obtain the plurality of depth maps together with the plurality of images as a plurality of depth-enriched images IM0, IM30. Hence, in this embodiment, the images are two-dimensional image comprising depth information so that the pixel information RGBDPIX may be said to be in Red-Green-Blue-Depth (RGBD) format as schematically indicated in FIG. 10a. In alternative embodiments, some illustrated below, the camera may be an image camera—shown as ICAM in FIG. 10b—and the image may be a two-dimensional image of which the pixel information RGBPIX may be said to be in Red-Green-Blue (RGB) format and the depth information D may be provided separately, so that depth-enriched pixel VRGBDPIX may be obtained from combining the pixel information RGBPIX with the depth information D, as schematically indicated in FIG. 10b.

In this schematic example, the plurality of images comprises 12 images which the depth information (D) are captures at positions along circular trajectory TRJ which are 30 degrees of viewing direction apart, and the images may be referred to as IMn with n=0, 30, 60, . . . , at viewing directions Dn, at viewing positions An, where n schematically indicates the viewing direction in degrees.

Figure 2:
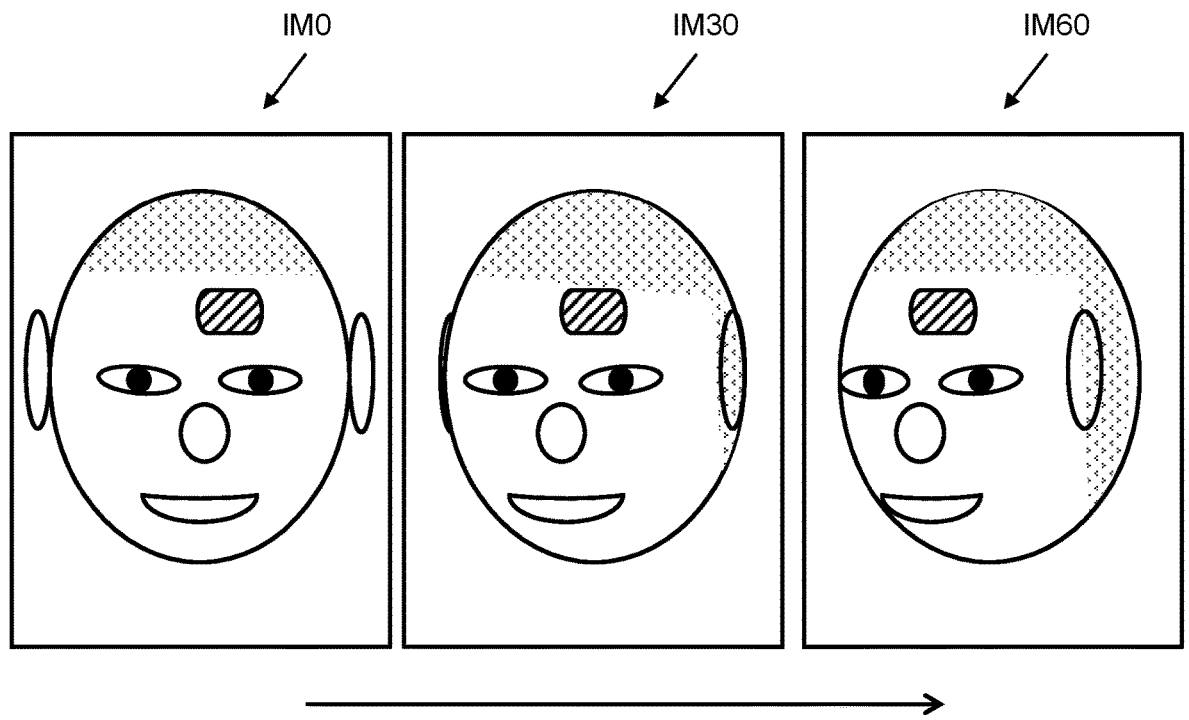
FIG. 2 schematically shows a presentation of a sequence of a part of a plurality of images of a body part.

FIG. 2 schematically shows a presentation of a sequence of a part of plurality of images IM0, IM30, IM60, as obtained as described with reference to FIG. 1 or according to other embodiments. The arrow in FIG. 2 schematically indicates that the images IM0, IM30, IM60 are sequentially presented on a display unit. The presentation corresponds to showing the images IM0, IM30, IM60 as taken from different viewing directions DIR0, DIR30, DIR60. Such presentation may be perceived as a three-dimensional visualization of the head SUBJ. Such presentation may allow a user to inspect the head SUBJ or any part thereof from several directions. The presentation may allow zooming in to inspect specific parts in more detail.

Figure 3A:
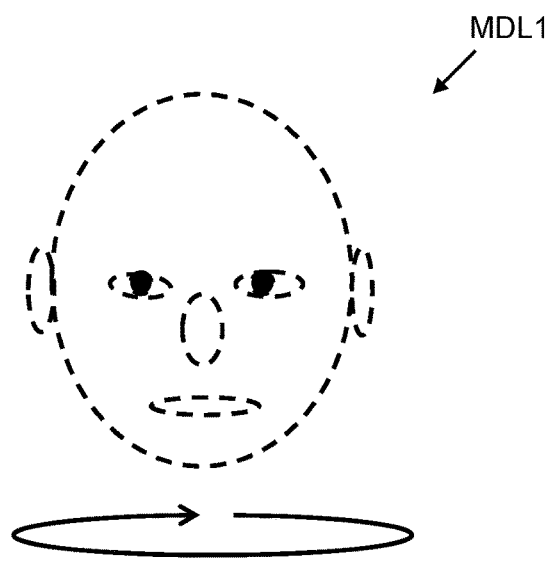
FIG. 3a schematically shows a three-dimensional model of a body part.

FIG. 3a schematically shows a three-dimensional model MDL1 of a body part, the body part being the head schematically shown in FIGS. 1 and 2. The three-dimensional model MDL1 may be obtained from the plurality of images, the plurality of depth maps or the combination of the plurality of images and the plurality of depth maps. For example, depth maps obtained from different viewing angle may be processed to obtain a full three-dimensional model MDL1. The curled arrow in FIG. 3a indicated that the head drawn in dashed lines is not a two-dimensional image but a three-dimensional object. Positions in the images may be related to positions on the 3D model. E.g., the system may relate positions in the images to positions on the 3D model from projection of the 3D model on the image or vice versa, by using the viewing directions and positions from the various images and depth maps. E.g., the images and the 3D model may be divided into polygons, and the polygons of the images may be associated with polygons of the 3D model.

Figure 3B:
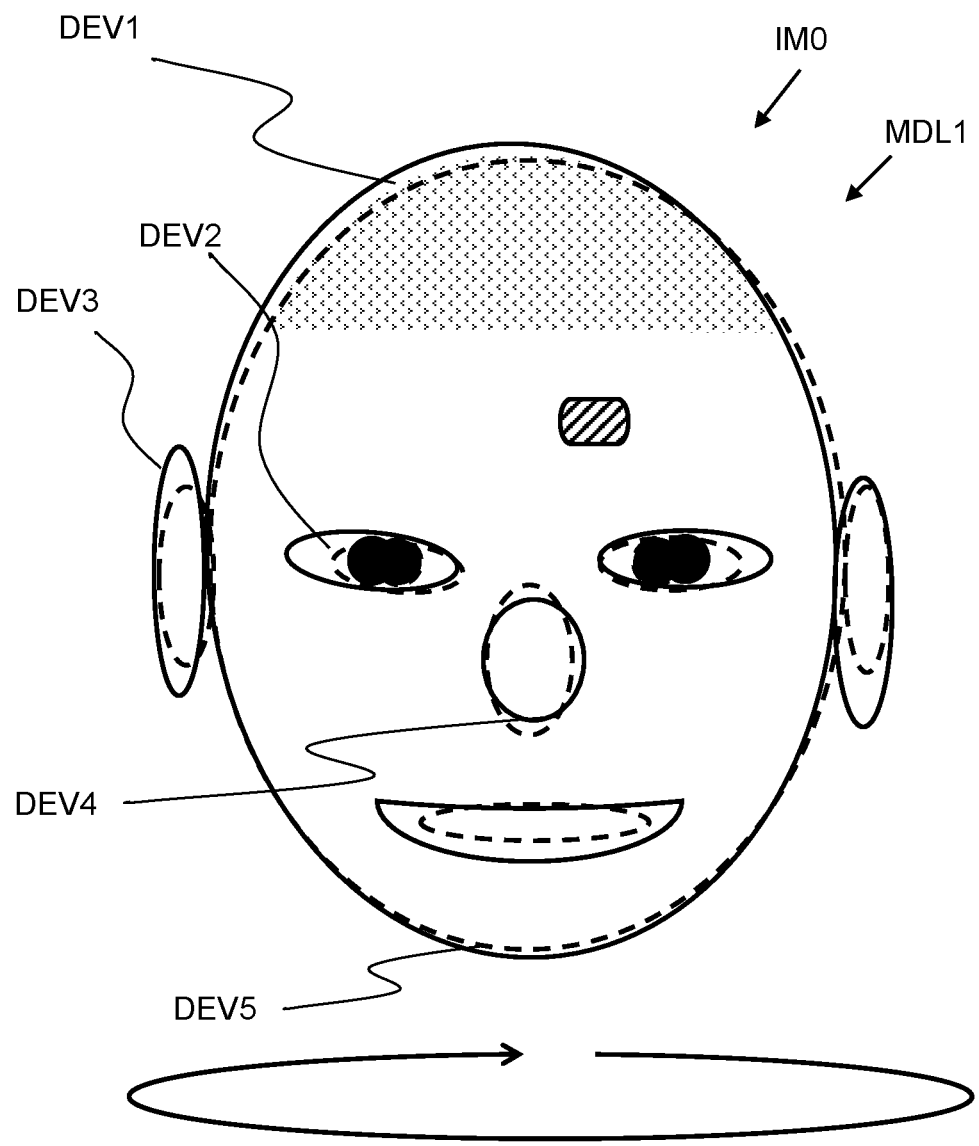
FIG. 3b schematically shows a 3D visualization of the body part together with a three-dimensional model.

FIG. 3b schematically shows a 3D visualization of the body part together with a three-dimensional model. More specifically, FIG. 3b schematically shows a visualization of the head SUBJ in viewing direction DIR0 by presenting the image IM0 obtained with that viewing direction DIR0. FIG. 3b also schematically shows a view of three-dimensional model MDL1 from the same viewing direction DIR0, in dashed lines. The dashed line indicates that the three-dimensional model MDL1 may not be visible for the user. In other embodiments, the three-dimensional model MDL1 may also be presented to the user. FIG. 3b schematically shows that the three-dimensional model MDL1 and the image IM0 do not need to correspond exactly, nor very accurately, as there may be deviations in, e.g., scalp surface DEV1, eye size DEV2, ear size and position DEV3, nose size and/or provision DEV4, mouth size and/or position, as well as size and/or positions of other features on the head, in particular on the face or scalp. The system and method of the invention may be robust for deviations of significant dimension, such as 1-5 millimeters, as the three-dimensional model MDL1 provides merely a location reference for augmentation with augmented visual information and provides the correspondence of features in the various images so as to provide corresponding locations of the features in the various images, whereas the, original, images are used to show the head and the features.

Figure 4:
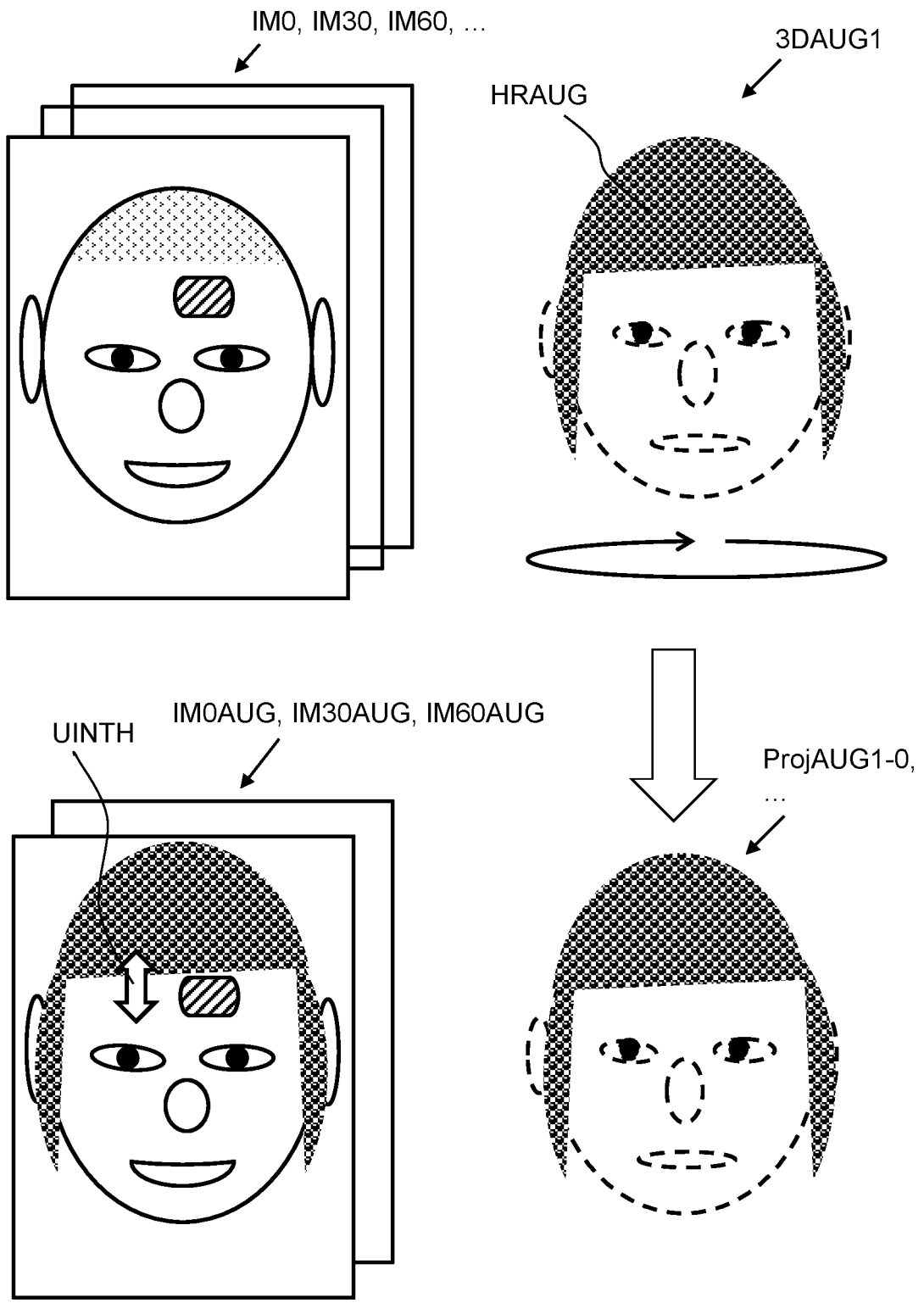
FIG. 4 schematically shows a method for obtaining a three-dimensional scan of a body part.
Figure 5:
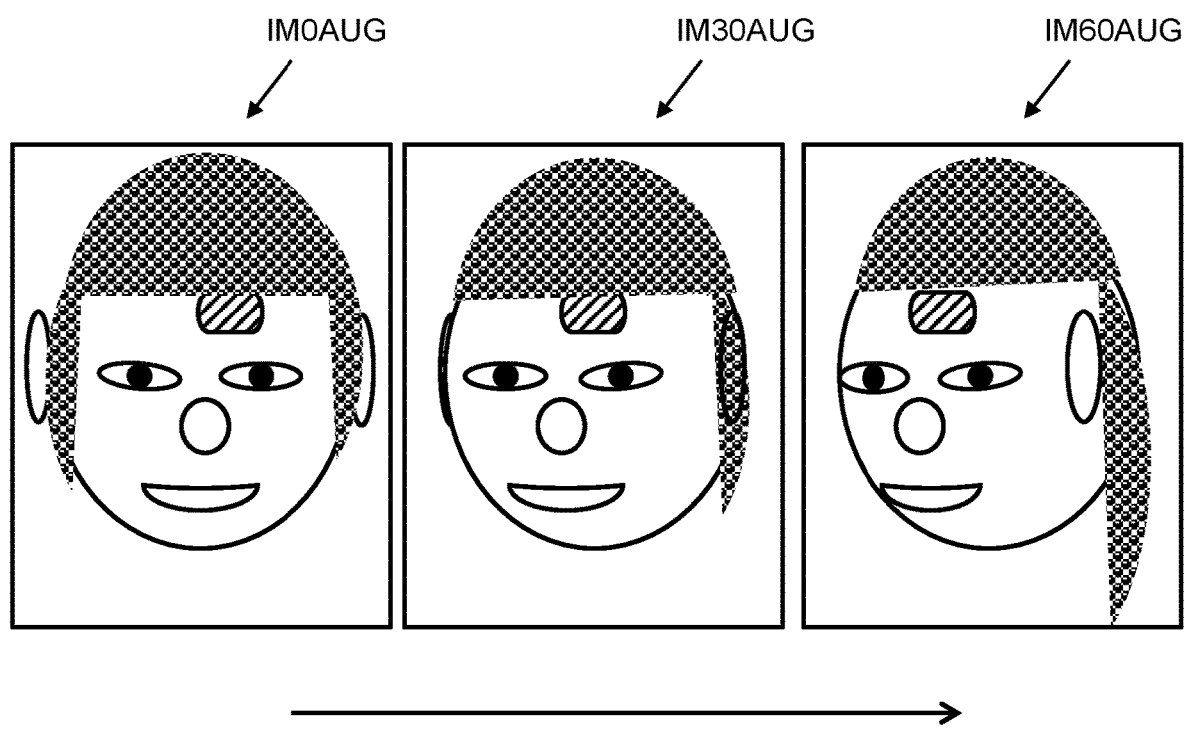
FIG. 5 schematically shows a presentation of a sequence of a part of a plurality of augmented images.

FIG. 4 schematically shows a method for obtaining a three-dimensional scan of a body part, using again the head SUBJ of the previous figures. The top left figure of FIG. 4 illustrates a plurality of images IM0, IM30 and a plurality of depth maps, e.g., as part of the images, obtained from the head from a plurality of viewing directions. In an embodiment, after presenting the sequence of at least part of the plurality of images to the user as described with reference to FIG. 2, a user input is obtained from the user. In this example, the user input relates to a hair line and hair length or haircut. Augmented visual information 3DAUG1 is derived from at least the user input and the three-dimensional model. In this example and referring to the top right figure of FIG. 4, the augmented visual information 3DAUG1 may relate to a three-dimensional hair pattern HRAUG, which may be a fixed predetermined hair pattern or selected from a predetermined plurality of hair patterns based on, e.g., the user input. The three-dimensional model may be used to obtain a view of the three-dimensional hair pattern in viewing directions corresponding to the viewing directions DIR0, DIR30, DIR60 of the plurality of images IM0, IM30, IM60, e.g., by projecting the augmented visual information 3DAUG1 according to the viewing directions DIR0, DIR30, DIR60 so as to obtain projected augmented visual information ProjAUG1-0, ProjAUG1-0, ProjAUG1-30, ProjAUG1-60 (the latter two not explicitly indicated in FIG. 4), as illustrated in the lower right figure of FIG. 4. At least part of the plurality of images IM0, IM30, IM60 may then be augmented with the augmented visual information 3DAUG1 to obtain a plurality of augmented images IM0AUG, IM30AUG, IM60AUG, e.g., by providing the projected augmented visual information ProjAUG1-0, ProjAUG1-0, ProjAUG1-30 on top of the corresponding images IM0, IM30, IM60 as illustrated in the lower left figure of FIG. 4. A sequence of at least part of the plurality of augmented images IM0AUG, IM30AUG, IM60AUG may be presented on the display unit. As illustrated in FIG. 5, this allows the user or another user to perceive a three-dimensional visualization of the head SUBJ as augmented with the augmented visual information 3DAUG1 by presenting the sequence, as indicated by the arrow, of least part of the plurality of augmented images IM0AUG, IM30AUG, IM60AUG corresponding to different viewing directions.

A further user input may be obtained from the user or another user during the presentation of the sequence of at least part of the plurality of augmented images IMOAUG, IM30AUG, IM60AUG. E.g., as shown in the lower left Figure of FIG. 4, a user interface may provide a visual hair line position indicator on one of the augmented images when shown on the display unit and the user may move the visual hair line position indicator to an alternative position of the hair line, or drawn an alternative hair line shape using the visual hair line position indicator. New augmented visual information may then be derived from at least the further user input and the three-dimensional model, where the new augmented visual information relates to a new three-dimensional hair pattern in accordance with the further user input. A new plurality of augmented images may then be created according to the same scheme as described above for the plurality of augmented images IMOAUG, IM30AUG, IM60AUG, and presented on the display unit to allow the user or another user to compare the effect of changing the hairline. Similarly may the user change the user input to change the length of the hair and/or to indicate a hair growth. Hereby, an optimal implantation pattern may be designed.

Figure 6:
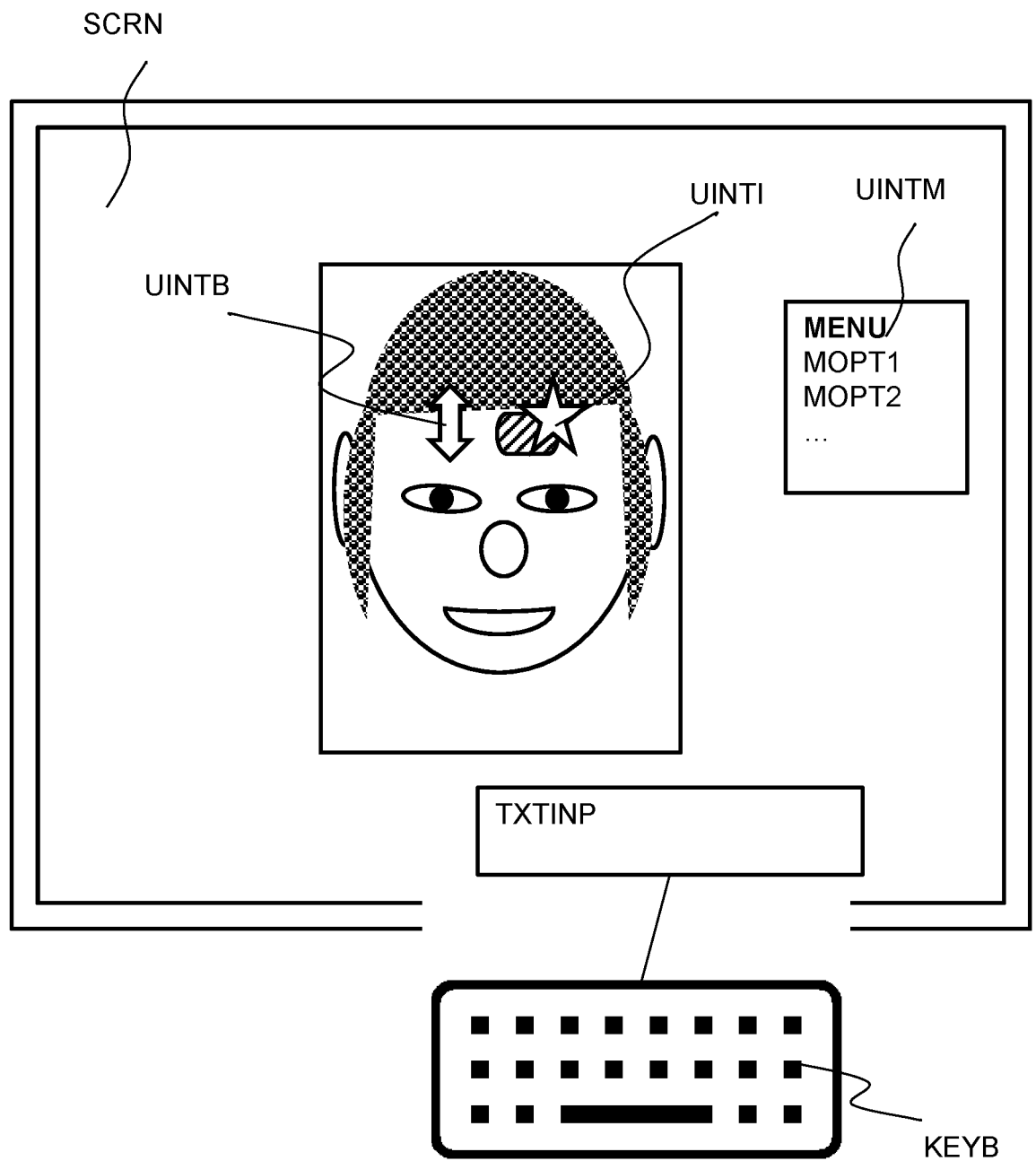
FIG. 6 schematically illustrates embodiments of user input.

FIG. 6 schematically illustrates various embodiments of user input. User input may relate to a position of a feature on the body part or body SUBJ, such as a coloured spot, an eye, an eyebrow, or a scar, or to a pattern or shape, such as a hair line or a haircut. Then user action may, e.g., allow interaction using a mouse, a touch screen or other means with a graphical symbol such as be a double arrow UINTH allowing a user to move the hairline, or a location indicator UINTI allowing a to indicate a spot ion one image from one viewing direction and allowing the user to inspect it from the other viewing directions. Then user action may, e.g., allow interaction a keyboard KEYB to type specific instructions top the system or to provide annotation as text input TXTINP. Then user action may, e.g., allow selection from a menu UINTM of several menu options MOPT1, MOPT2, e.g., to select between inputting different types of values for parameters, e.g. a first menu option MOPT1 which, when selected, allows to select hair color for the augmented visual information, and a second menu option MOPT2 which, when selected, allows to select hair length or hair density.

Figure 7A:
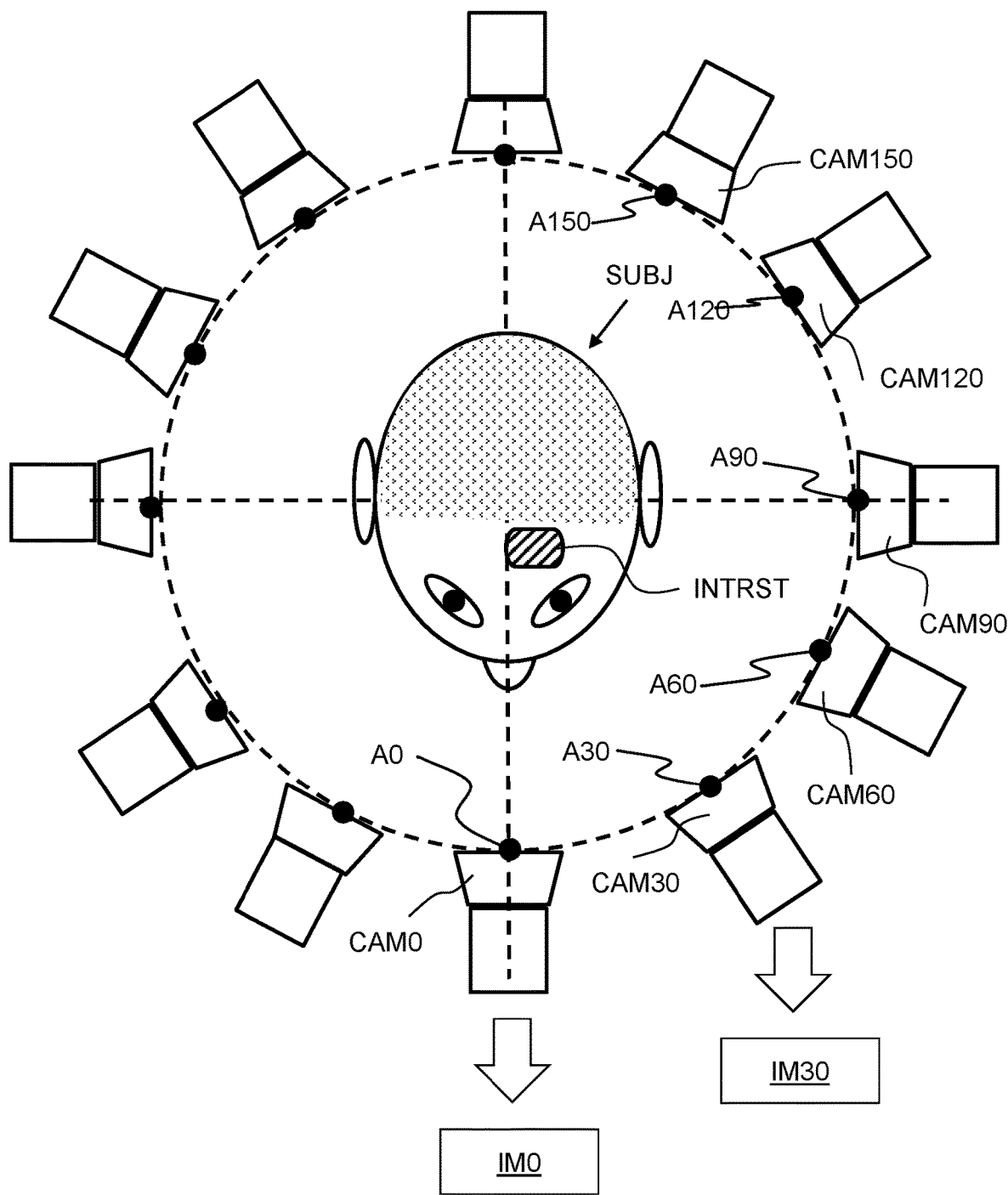
FIG. 7a and FIG. 7b schematically illustrate alternative embodiments.

FIG. 7a schematically illustrates an alternative embodiment. The embodiment in FIG. 7a differs from the embodiments described with reference FIGS. 1-6 in that, instead of a single camera CAM being repositioned at various positions around subject SUBJ, the system comprises a plurality of stationary cameras ICAM0, ICAM30, ICAM60, ICAM90, ICAM120, ICAM150, . . . positioned around the subject SUBJ, and used to obtain images IM0, IM30, IM60, IM90, IM120, IM150, . . . from the respective camera ICAM0, ICAM30, ICAM60, ICAM90, ICAM120, ICAM150.

Figure 7B:
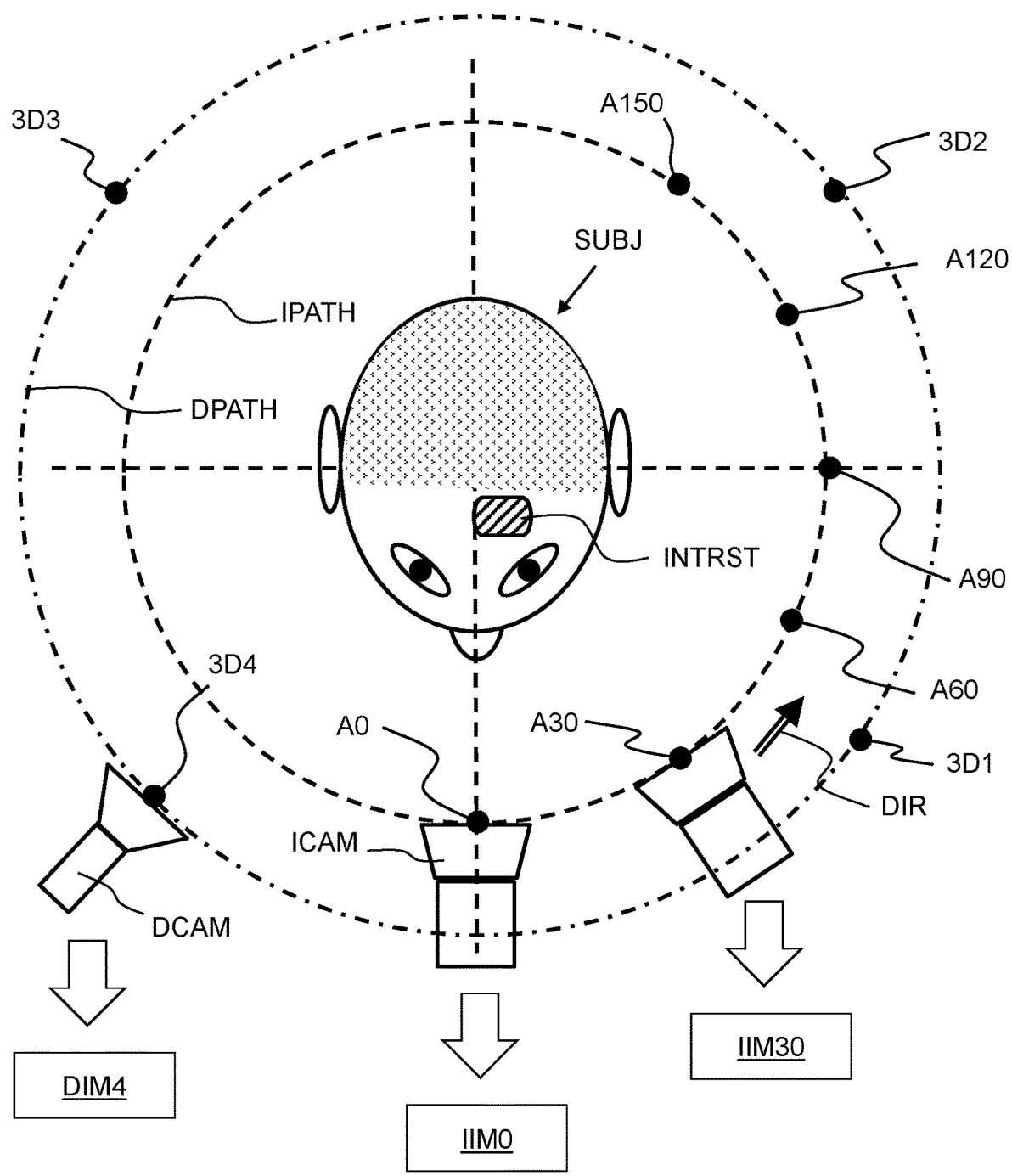

FIG. 7b schematically illustrates alternative embodiment. The embodiment in FIG. 7b differs from the embodiments described with reference FIGS. 1-7a in that, instead of a single 3D-camera CAM providing the plurality of images with depth information, the system comprises an image camera ICAM and a depth sensor DCAM. The depth sensor DCAM may also be referred to as depth camera DCAM. The image camera ICAM and a depth sensor DCAM may be arranged together and repositioned together along a trajectory around the body part SUBJ. In the alternative embodiment shown in FIG. 7, the image camera ICAM is configured and arranged to provide a first plurality of (RGB-) images IM0, IM30, . . . at a first plurality of positions A0, A30, A60, A90, A120, A150, . . . , and the depth camera DCAM is configured and arranged to provide a second plurality of depth maps DIM1, DIM2, DIM3, DIM4 at a second plurality of positions, wherein the second plurality is different from the first plurality. The first plurality of positions may be on a different trajectory, e.g., with the first plurality of positions on a trajectory IPATH close to the head SUBJ, for example to be able to image a high level of detail, and the second plurality of positions on a trajectory DPATH, for example selected to have optimal depth performance. In this embodiment, calibrating the positions of image camera ICAM and depth sensor DCAM may be used so as to obtain the relative positions and, e.g., to relate positions in the three-dimensional model to corresponding positions in the images.

Figure 8:
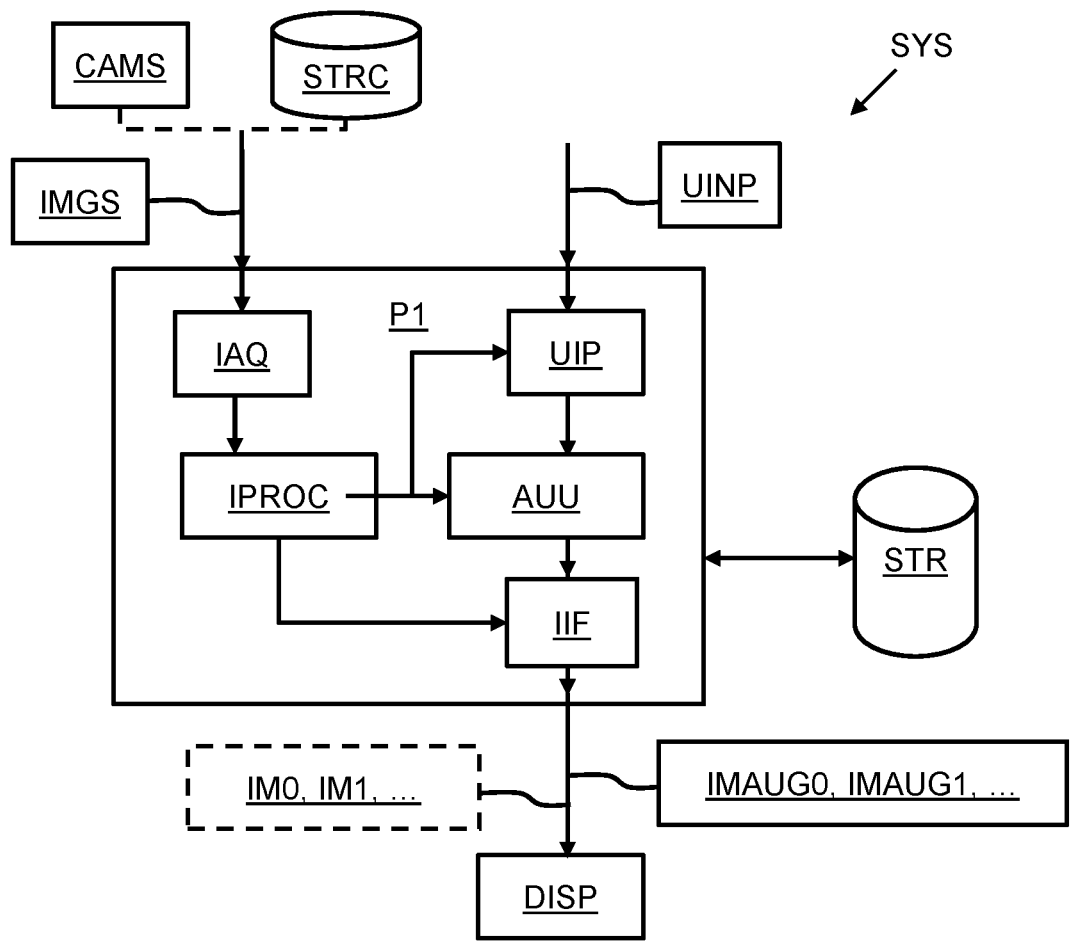
FIG. 8 schematically illustrates a system according to an embodiment.

FIG. 8 schematically illustrates a system SYS according to an embodiment. System SYS comprises an image acquisition system IAQ, an image processor IPROC, an image interface IIF, a user input processor UIP and an augmenting unit AUU. The image acquisition system IAQ, the image processor IPROC, the image interface IIF, the user input processor UIP and the augmenting unit AUU may be provided in a signal processor P1 according to any suitable hardware distribution, or alternatively be distributed over multiple hardware and software blocks. System SYS comprises a display unit DISP. In an alternative embodiment, the system is configured and arranged for cooperating with a display unit DISP that may be connected to the system. The image acquisition system IAQ is configured and arranged for obtaining a plurality of images IMGS from the body part or the complete body from a first plurality of first viewing directions and for obtaining a plurality of depth maps from the body part or the complete body from a second plurality of second viewing directions. In the example shown in FIG. 8, the depth maps are provided with the images as depth-enriched images. The images and depth maps may be obtained real-time from one or more cameras CAMS or from a storage STRC. The image processor IPROC is configured and arranged for determining a three-dimensional model of the body part or the complete body from the plurality of images and/or the plurality of depth maps. In this exemplary embodiment, image interface IIF is configured and arranged for presenting a sequence of at least part of the plurality of images on the display unit DISP for allowing a user to perceive a three-dimensional visualization of the body part or the complete body and is hereto configured and arranged to provide the sequence of the at least part of the plurality of images IM0, IM1, . . . on the display unit DISP. In other embodiments, the image interface is configured and arranged for presenting such sequences only upon a user request or only when the images are augmented with augmented visual information. The user input processor UIP is configured and arranged for obtaining a user input UINP from the user and deriving augmented visual information from at least the user input and the three-dimensional model, The augmenting unit AUU is configured and arranged for using the three-dimensional model and the augmented visual information to augment at least part of the plurality of images with the augmented visual information to obtain a plurality of augmented images. The image interface IIF is further configured and arranged for presenting a sequence of at least part of the plurality of augmented images on the display unit DISP allowing the user or another user to perceive a three-dimensional visualization of the body part or the complete body as augmented with the augmented visual information, and is hereto configured and arranged for providing the sequence of at least part of the plurality of augmented images IMAUG0, IMAUG1, . . . on the display unit DISP. The system also comprises a database STR wherein pluralities of images and/or augmented images and/or supplementary data may be stored and later retrieved to allow comparisons at various moments in time.

Figure 9:
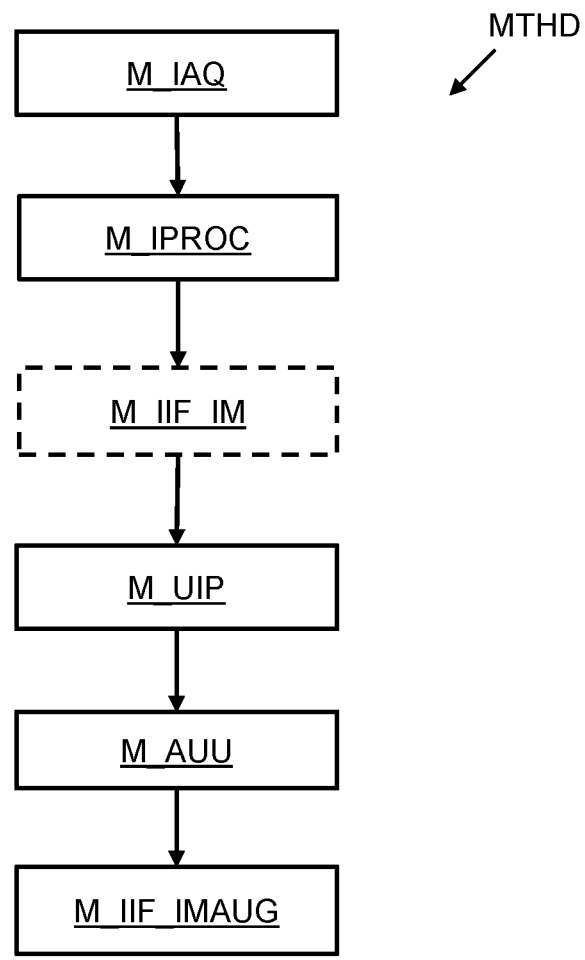
FIG. 9 schematically illustrates a method according to an embodiment.

FIG. 9 schematically illustrates a method MTHD according to an embodiment. Method MTHD comprises obtaining M_IAQ a plurality of images from the body part or the complete body from a plurality of viewing directions and a plurality of depth maps from the body part or the complete body from a second plurality of second viewing directions. Method MTHD comprises determining IPROC a three-dimensional model of the body part or the complete body from the plurality of images and/or plurality of depth maps. In embodiments, the method comprises presenting a sequence of at least part of the plurality of images allowing a user to perceive a three-dimensional visualization of the body part or the complete body. In other embodiments, the method comprises presenting a sequence of at least part of the plurality of images allowing a user to perceive a three-dimensional visualization of the body part or the complete body in response to a user request. In other embodiments, the method comprises presenting a sequence of at least part of the plurality of images allowing a user to perceive a three-dimensional visualization of the body part or the complete body in absence of a user request to not present such sequence. Method MTHD comprises obtaining M_UIP a user input from the user and deriving augmented visual information from at least the user input and the three-dimensional model. Method MTHD comprises using M_AUU the three-dimensional model and the augmented visual information to augment at least part of the plurality of images with the augmented visual information to obtain a plurality of augmented images. Method MTHD comprises presenting M_IIF_IMAUG a sequence of at least part of the plurality of augmented images allowing the user or another user to perceive a three-dimensional visualization of the body part or the complete body as augmented with the augmented visual information.

FIG. 10a and FIG. 10b schematically illustrates two examples of acquiring images and depth maps (incl depth-enriched image), in particular examples of pixel data formats for the images and, integrated or separate depth maps.

FIG. 10a schematically shows a pixel data format for depth-enriched images. Herein, depth information associated with each image IM0, IM30 of the plurality of images is provided by the camera when capturing the images, so as to obtain the plurality of depth maps together with the plurality of images as a plurality of depth-enriched images IM0, IM30. Hence, in this embodiment, the images are two-dimensional image comprising depth information so that the pixel information RGBDPIX may be said to be in Red-Green-Blue-Depth (RGBD) format as schematically indicated in FIG. 10a. The skilled person will appreciate that the color information, here presented as Red-Green-Blue may also be presented using alternative colour channels such as YUV, Red-Green-Blue-Yellow, Red-Green-Blue-White, or as black/white with grey scales.

FIG. 10b schematically shows an alternative pixel data format. Herein, a camera provides a two-dimensional image of which the pixel information RGBPIX may be said to be in Red-Green-Blue (RGB) format. Herein, the depth information D is obtained separately from a depth sensor or depth camera. A depth-enriched pixel VRGBDPIX may herein be obtained from combining the pixel information RGBPIX with the depth information D, as schematically indicated in FIG. 10b.

In another embodiment, depth information is not attributed to individual pixels of each image, but the three-dimensional model is made from the plurality of depth maps without using the images (i.e., their RGB content).

Figure 11:
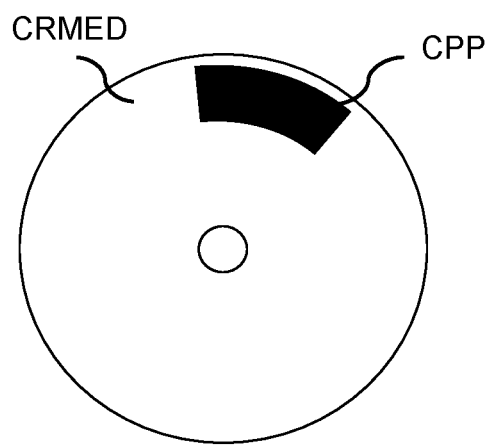
FIG. 11 shows a computer readable medium comprising a computer program product.

FIG. 11 shows a computer readable medium CRMED comprising a computer program product CPP, the computer program product CPP comprising instructions for causing a processor apparatus to perform a method according to any one embodiment or a part of thereof. The computer program product CPP may be embodied on the computer readable medium CRMED as physical marks or by means of magnetization of the computer readable medium CPP. However, any other suitable embodiment is conceivable as well. Furthermore, it will be appreciated that, although the computer readable medium CRMED is shown in FIG. 11 as an optical disc, the computer readable medium CRMED may be any suitable computer readable medium, such as a non-tangible computer readable medium such as a signal for wired or wireless transmission, or a tangible computer readable medium such as a hard disk, solid state memory, flash memory, etc., and may be non-recordable or recordable. The computer program product CPP may thus comprise a computer program comprising instructions arranged to, when executed by a computer, execute at least part of the method of any one of the embodiments described above.

It should be noted that the above-mentioned embodiments illustrate rather than limit the invention, and that those skilled in the art will be able to design many alternative embodiments.

Where the claims refer to a system performing a certain action, the claim may be understood as referring to a system arranged for performing a certain action, a system configured for performing a certain action, or a system configured and arranged for performing a certain action.

The invention may be applied in a cosmetic application. E.g., it may be used in cosmetic hair transplant, in cosmetic surgery such as reconstruction or shaping of specific parts of the human body or face, e.g., nose, ear, or eyelid shaping, or such a removal of a mole or other structure for cosmetic reasons. The invention may be applied in a medical application, such as in medical treatment or surgery, e.g., to monitor a possible malicious spot, e.g., to monitor a possible melanoma.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-type optical disc, a DVD-type optical disc, a hard disk, or diskette, stored with data loadable in a memory of a computer system, the data representing the computer program. The data carrier may thus be a tangible data carrier. The data carrier may be a data connection, such as a telephone cable or a network cable. The data carrier may further be a non-tangible data carrier such as a wireless connection.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for obtaining a three-dimensional (3D) scan of a body part or a complete body to enable inspection of at least a part of the body part or the complete body, the system comprising an image acquisition system, an image processor, an image interface, a user input processor and an augmenting unit, and the system further comprising or being configured and arranged for cooperating with a display unit such that:

the image acquisition system is configured and arranged for obtaining a plurality of images from the body part or the complete body from a first plurality of first viewing directions and for obtaining a plurality of depth maps from the body part or the complete body from a second plurality of second viewing directions, the image processor is configured and arranged for determining a three-dimensional model of the body part or the complete body from the plurality of images and/or the plurality of depth maps, the user input processor is configured and arranged for obtaining a user input from the user and deriving augmented visual information from at least the user input and the three-dimensional model, the augmenting unit is configured and arranged for using the three-dimensional model and the augmented visual information to augment at least part of the plurality of images with the augmented visual information to obtain a plurality of augmented images, and the image interface is configured and arranged for presenting a sequence of at least part of the plurality of augmented images on the display unit allowing the user or another user to perceive a three-dimensional visualization of the body part or the complete body as augmented with the augmented visual information.

2. The system according to claim 1, wherein the image interface is further configured and arranged for presenting a sequence of at least part of the plurality of images on the display unit for allowing a user to perceive a three-dimensional visualization of the body part or the complete body.

3. The system according to claim 1,
wherein obtaining a user input from the user comprises:
receiving one or more spatial locations in a first image from the sequence of at least part of the plurality of images as the user input,
wherein deriving augmented visual information from the user input comprises:
deriving one or more location visualizer objects from the one or more spatial locations to derive at least part of the augmented visual information, and
wherein using the three-dimensional model and the augmented visual information to augment at least part of the plurality of images with augmented visual information to obtain a plurality of augmented images comprises:
augmenting the at least part of the plurality of images with a visualization of the one or more location visualizer objects to obtain the at least part of plurality of augmented images and to indicate the one or more spatial locations as indicated in the first image in the at least part of the plurality of images.

4. The system according to claim 3, wherein the one or more spatial locations indicate at least one item of a predetermined class, allowing to inspect the one or more spatial locations from various viewing directions from at least part of the plurality of augmented images.

5. The system according to claim 3, wherein the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information.

6. The system according to claim 1, wherein
the system comprises or is arranged to cooperate with one or more cameras, and wherein
the obtaining the plurality of images comprises positioning the one or more cameras at a plurality of positions along a trajectory around the body part or the complete body and configured and arranged to use the camera to capture a plurality of images from the body part or the complete body from the first plurality of first viewing directions from the plurality of positions along the trajectory.

7. The system according to claim 6, wherein one or more cameras are further configured and arranged to provide depth information associated with each image of the plurality of images when capturing the images, so as to obtain the plurality of depth maps together with the plurality of images as a plurality of depth-enriched images.

8. The system according to claim 6, wherein
the image acquisition system comprises or is arranged to cooperate with one or more depth sensors, and wherein
the obtaining the plurality of depth maps comprises positioning the one or more depth sensors together with the one or more cameras at the plurality of positions along the trajectory and using the plurality of depth sensors to provide the plurality depth maps.

9. The system according to claim 6, wherein
the image acquisition system comprises or is arranged to cooperate with a depth sensor, and wherein
the obtaining the plurality of depth maps comprises positioning the depth sensor separate from the camera at a second plurality of positions along the trajectory and using the depth sensor to provide depth information to provide the plurality depth maps.

10. The system according to claim 1, wherein
the image acquisition system comprises or is arranged to cooperate with a storage, and wherein
the obtaining the plurality of images comprises retrieving at least the plurality of images from the storage wherein the plurality of images were previously stored and/or obtaining the plurality of depth maps comprises retrieving at least the plurality of depth maps from a storage wherein the plurality of depth maps were previously stored.

11. The system according claim 1, further configured and arranged for obtaining a plurality of reference images from the body part or the complete body from a first further plurality of first further viewing directions and for obtaining a plurality of reference depth maps from the body part or the complete body from a second further plurality of second further viewing directions, and for allowing to present the sequence of at least part of the plurality of augmented images to compare a three-dimensional visualization of the body part or the complete body as augmented with the augmented visual information with a three-dimensional visualization of the body part or the complete body derived from the reference images.

12. The system according to claim 1, wherein the three-dimensional model of the body part or the complete body has a spatial resolution which is smaller than the spatial resolution of each of the image from the plurality of images by a reduction factor in a range of 3-100, such as 3-20, such as 5-10.

13. The system according to claim 1, wherein using the three-dimensional model and the augmented visual information to augment at least part of the plurality of images with the augmented visual information to obtain a plurality of augmented images comprises:
using location information from the three-dimensional model to match a first location in a first image, a second location in the second image and an augmented location in the augmented visual information; and
to augment the first image at the first location and the second location in the second image with the augmented visual information at the augmented location.

14. The system or method according to claim 13, wherein the augmented visual information corresponds to a change in characteristics of hair.

15. The system according to claim 1, wherein obtaining a user input from the user comprises relating a user input location, such as a click with a pointer device on a position on the display unit when the display unit presents the sequence of at least part of the plurality of images, to a position in the three-dimensional model associated with a position of an image feature on one image of the sequence of at least part of the plurality of images, and wherein deriving augmented visual information from at least the user input and the three-dimensional model uses the position in the three-dimensional model to derive augmented visual information for at least part of other images of the sequence of at least part of the plurality of images.

16. A method for obtaining a three-dimensional (3D) scan of a body part or a complete body to enable inspection of at least a part of the body part or the complete body, the method comprising:
obtaining a plurality of images from the body part or the complete body from a first plurality of first viewing directions and a plurality of depth maps from the body part or the complete body from a second plurality of second viewing directions,
determining a three-dimensional model of the body part or the complete body from the plurality of images and/or plurality of depth maps,
obtaining a user input from the user and deriving augmented visual information from at least the user input and the three-dimensional model,
using the three-dimensional model and the augmented visual information to augment at least part of the plurality of images with the augmented visual information to obtain a plurality of augmented images, and
presenting a sequence of at least part of the plurality of augmented images allowing the user or another user to perceive a three-dimensional visualization of the body part or the complete body as augmented with the augmented visual information.

17. The method according to claim 16, the method further comprising presenting a sequence of at least part of the plurality of images allowing a user to perceive a three-dimensional visualization of the body part or the complete body.

18. The method according to claim 16, wherein
the obtaining a user input from the user comprises:
  receiving one or more spatial locations in a first image from the sequence of at least part of the plurality of images as the user input, wherein
deriving augmented visual information from the user input comprises:
  deriving one or more location visualizer objects from the one or more spatial locations to derive at least part of the augmented visual information; and wherein
using the three-dimensional model and the augmented visual information to augment at least part of the plurality of images with augmented visual information to obtain a plurality of augmented images comprises:
  augmenting the at least part of the plurality of images with a visualization of the one or more location visualizer objects to obtain the at least part of plurality of augmented images and to indicate the one or more spatial locations as indicated in the first image in the at least part of the plurality of images.

19. The method according to claim 18, wherein:
the one or more spatial locations indicate at least one item of a predetermined class, allowing to inspect the one or more spatial locations from various viewing directions from at least part of the plurality of augmented images, or
the one or more spatial locations indicate at least part of a hairline position, wherein the hairline position is at least one of an existing hairline position in the first image from the sequence of at least part of the plurality of images and a fictitious hairline position for deriving an augmented visual hairline as part of the augmented visual information.

20. A computer program product comprising a computer program stored in a non-transitory computer-readable storage medium, the computer program comprising instructions arranged to, when executed by a computer, execute at least part of one of the method according to claim 16.

* * * * *